United States Patent
Bonomi et al.

(10) Patent No.: US 6,219,352 B1
(45) Date of Patent: Apr. 17, 2001

(54) QUEUE MANAGEMENT WITH SUPPORT FOR MULTICASTS IN AN ASYNCHRONOUS TRANSFER MODE (ATM) SWITCH

(75) Inventors: Flavio Giovanni Bonomi, Palo Alto; Kannan Devarajan, Cupertino, both of CA (US)

(73) Assignee: Cabletron Systems, Inc., Rochester, NH (US)

( * ) Notice: Subject to any disclaimer, the term of this patent is extended or adjusted under 35 U.S.C. 154(b) by 0 days.

(21) Appl. No.: 08/977,661

(22) Filed: Nov. 24, 1997

(51) Int. Cl.$^7$ .................................................. H04L 12/54
(52) U.S. Cl. ........................... 370/417; 370/429; 370/432
(58) Field of Search ..................................... 370/395, 398, 370/399, 412, 413, 414, 415, 416, 417, 418, 422, 423, 424, 426, 428, 429, 432, 390

(56) References Cited

U.S. PATENT DOCUMENTS

| | | | | |
|---|---|---|---|---|
| 4,864,559 | * | 9/1989 | Perlman | 370/256 |
| 5,224,099 | * | 6/1993 | Corbalis et al. | 370/412 |
| 5,465,331 | * | 11/1995 | Yang et al. | 709/244 |
| 5,583,861 | * | 12/1996 | Holden | 370/395 |
| 5,689,500 | * | 11/1997 | Chiussi et al. | 370/235 |
| 5,724,358 | * | 3/1998 | Headrick et al. | 370/418 |

* cited by examiner

*Primary Examiner*—Wellington Chin
*Assistant Examiner*—Kwang B. Yao
(74) *Attorney, Agent, or Firm*—Law Firm of Naren Thappeta

(57) ABSTRACT

An ATM switch supporting multicast transmissions and efficient transmission of frames. A cell is received on a multicast connection and transmitted on several branches/ports. Instead of copying a multicast cell several times for each output branch, only one copy of each multicast cell is maintained. The cell order and the stored cell data form a physical queue. Several logical queues are maintained, one for each output branch. In one embodiment, linked lists are used to maintain the queues. A cell in the physical queue is deleted after all logical queues traverse that cell. A shared tail pointer is used for all the logical queues to minimize additional processing and memory requirements due to the usage of logical queues. The queues enable cells forming a frame to be buffered until the end of frame cell is received, which provides for efficient handling of frames.

45 Claims, 10 Drawing Sheets

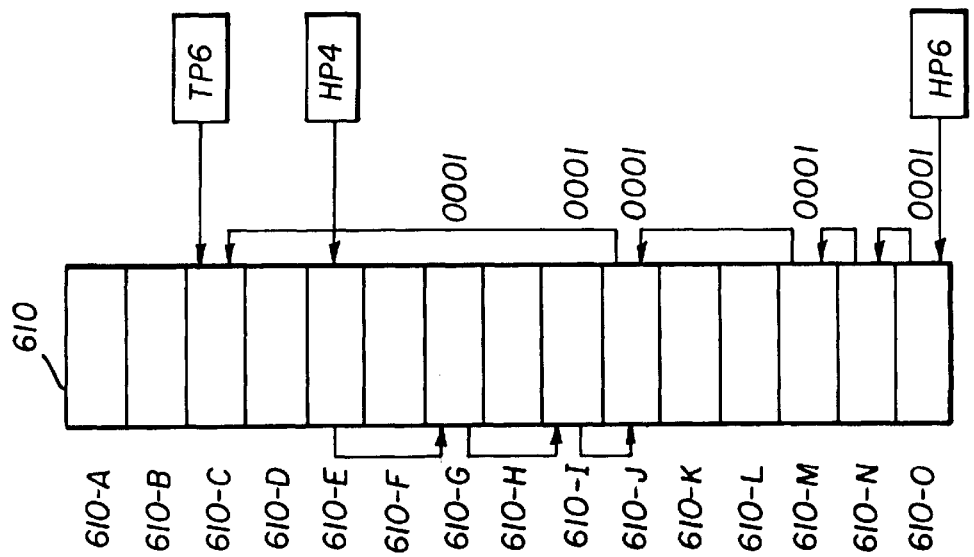
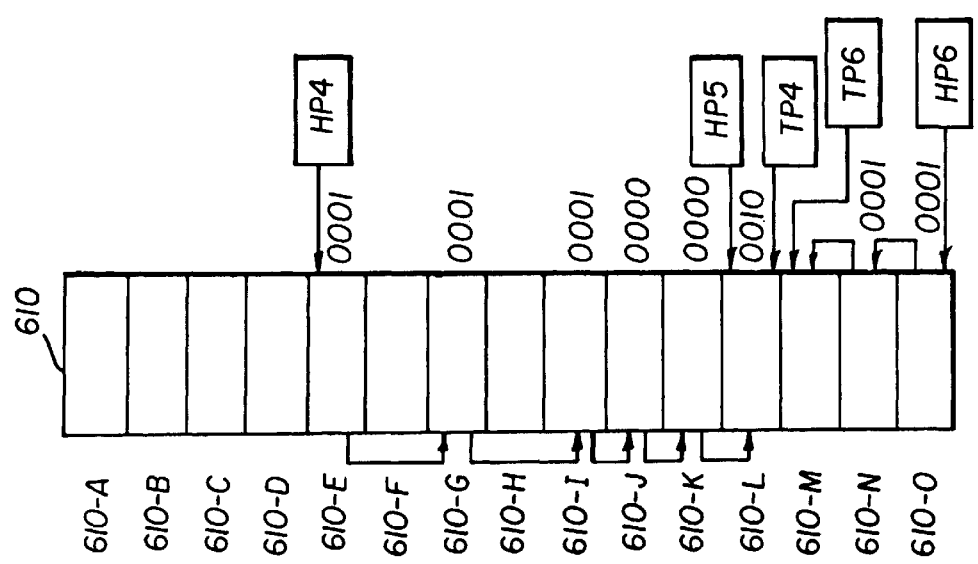

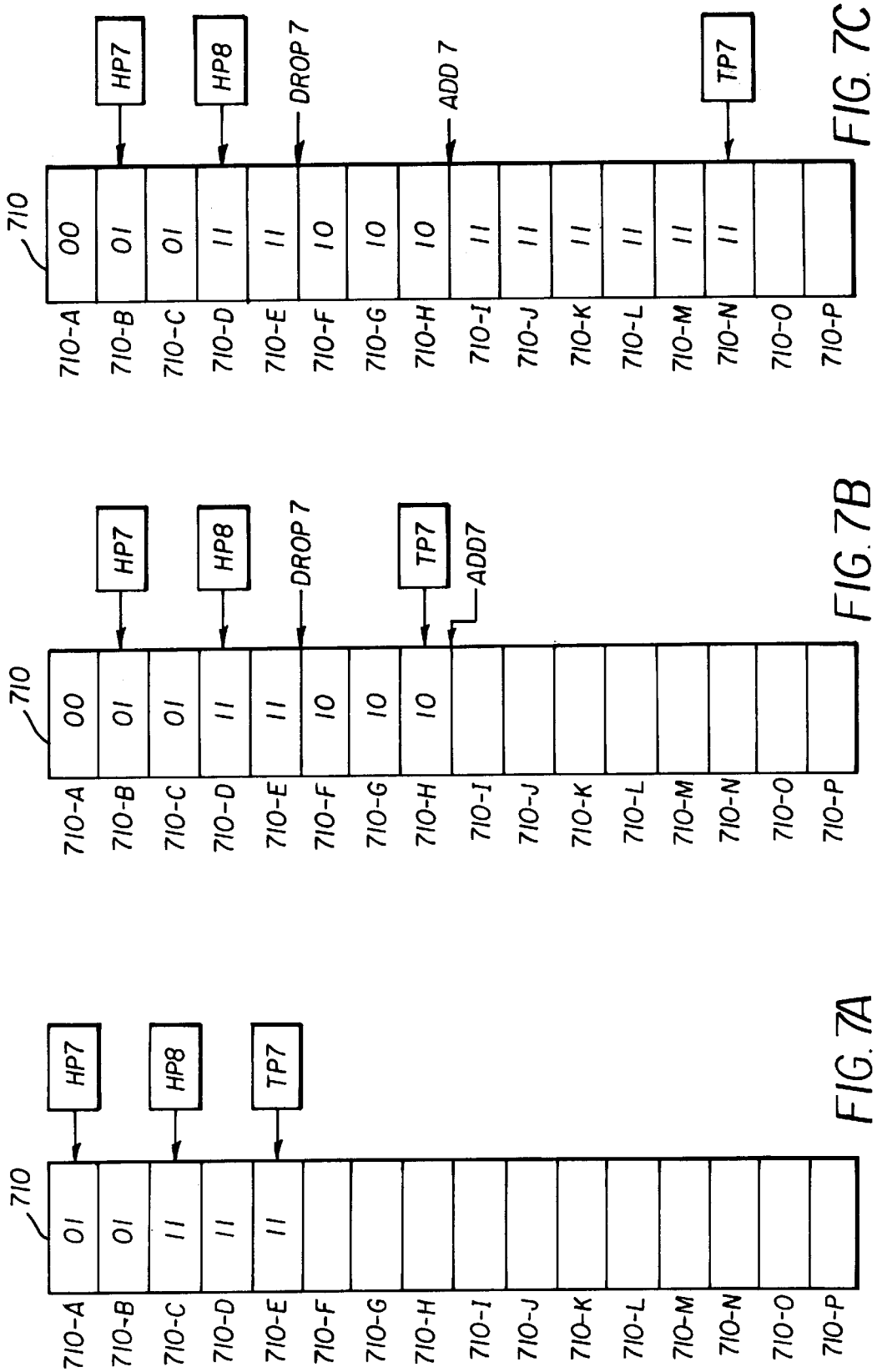

QUEUE MANAGEMENT WITH SUPPORT FOR MULTICASTS IN AN ASYNCHRONOUS TRANSFER MODE (ATM) SWITCH

RELATED APPLICATIONS

The present application is related to the co-pending United States Patent Application Entitled, "A Flexible Scheduler in an Asynchronous Transfer Mode (ATM) Switch", Filed on even date herewith, Ser. No. 08/977,661 filed Nov. 24, 1997, (hereafter "RELATED APPLICATION 1") and is incorporated by reference in its entirety herewith.

BACKGROUND OF THE INVENTION

1. Field of the Invention

The present invention relates generally to communication networks, and more specifically to a method and apparatus for managing queues in an asynchronous transfer mode (ATM) switch to provide support for both multicast and unicast transmissions in a communication network.

2. Related Art

Different types of communication networks have evolved in the past to provide different types of services. For example, voice networks allow users to converse in a telephone conversation and data networks allow users to share vast quantities of data. In general, each type of communication network can have different requirements for providing the corresponding services. As an illustration, voice networks may need predictable bandwidth with low latencies to support voice calls while data networks may need high bandwidth in bursts to support large data transfers.

Due to such varying requirements, different types of communication networks have evolved with separate communication backbones, possibly implemented with different technologies. Often, these different technologies are implemented using very different techniques or principles. For example, voice networks have been implemented using a technique commonly referred to as time division multiplexing, which provides fixed and predictable bandwidth for each voice channel. On the other hand, data networks (such as those based on Internet Protocol) have been implemented to share available bandwidth on demand. That is, any end-system of a data network can potentially use all the available bandwidth at a given instance of time, and then the other systems have all the bandwidth for use.

In general, having separate communication backbones for communication networks results in inefficiency in the usage of the overall bandwidth. According to the well-known principle of 'economy of scale', ten servers serving hundred customers of a single queue generally provide slower service than thousand servers serving ten thousand clients even though the server-client ratio is the same. There is more efficiency with larger numbers typically because any of the larger pool of available servers can immediately serve a customer in a queue, and thus keep the queue length short.

The inefficiency (due to separate communication backbones) can result in degradation of aggregate service levels or in inability to provide more services. The problem can be exasperated with the increasing demands being placed on the networks. In addition, the overhead to manage the separate networks may be unacceptably high due to the increased number of components in the overall system. Further, the same end-station can be providing different services, which have varying requirements. For example, a computer system may be used for diverse applications such as data sharing, telephone conversations, and video conferencing applications.

Accordingly, the communications industry has been migrating towards a shared communications backbone for all the different types of services. Asynchronous transfer mode (ATM) is one standard which allows such a shared communication backbone. In general, an ATM network includes several ATM switches connecting several end-systems. Each switch includes several ports to connect to end systems and other switches. A switch receives a cell on one port and forwards the cell on another port to provide a connection between (or among) the end-systems. A cell is a basic unit of communication in ATM networks. The cell size is designed to be small (fifty-three bytes), and such small size enables each cell to be served quickly. In turn, the quickness enables support for diverse types of applications (voice, video, data), with each application receiving a service according to its own requirements.

To communicate with another end-station, an end-station of a communication network (such as an ATM network) usually 'opens a connection'. Opening a connection generally refers to determining a sequence of switches between the two end-stations such that the switches provide a determined communication path between the two end-stations with any specific service levels required for the communication. The desired service levels may include the required bit rates, latencies etc., which makes each connection suitable for the particular service it is being used for.

Once a connection is established, the end systems communicate with each other using cells in an ATM environment. Each cell has header information which helps identify the communication path. Using the header information, the switches forward each cell to the destination end-system. Each cell is typically forwarded according to the service levels the corresponding connection is set up with.

A cell switch (i.e., ATM switch) typically includes a memory storage to store large volume of cells received on different ports. The memory provides a temporary storage for each cell as the cells await their turn for transmission to a next switch (or end-system) in the communication path. Such a wait is typically present due to reasons such as numerous cells from several ports arriving for transmission on the same port.

For the ATM backbone to be usable for different types communication services (e.g., voice and data services), the ATM backbone needs to support different features the end applications (running on the end-systems) may require. One such feature is the multicast capability. Multicast typically refers to the ability of one end-station (source end station) to send a cell to several end-stations (target end-stations) without the source end-station having to retransmit the cell to the individual target end stations. Thus, a multicast connection may be viewed as a tree having several output branches corresponding to a single root or source.

To support multicasts, an intermediate switch may transmit each cell received on a multicast connection on several ports, with each transmission corresponding to an output branch. A cell transmitted on a port may be transmitted on several additional ports in another switch located further down the cell transmission path. Such transmission on multiple ports in one or more intermediate switches enables an ATM backbone to support multicast transmissions.

Thus, when a source end-system sends a sequence of multicast cells on a multicast connection, a switch may need to transmit each of the cells several times (corresponding to several branches) to ensure that the cell is received by all of the intended target end-systems. A switch may maintain multiple copies of each multicast cell, with each copy being used for transmission on an output branch.

Unfortunately, such multiple copies may require a large memory in the switch, and such large memories may be undesirable for cost or availability reasons. The memory problem may be particularly accentuated when a switch may maintain a queue for each branch (as opposed to just one queue for each port or class of service). Maintaining a queue for each branch generally provides the flexibility to serve each connection according to the specific service parameters (e.g., bit rates, latencies etc.) with which the connection may have been setup. Thus, if the multicast cells are copied for each branch, it may consume unacceptably large amounts of memory.

Accordingly, what is needed is a queuing method and apparatus in an ATM switch which enables support for multicasts without requiring large memories, particularly in systems which maintain a queue for cells of each connection.

In addition, the ATM switch may need to support a high throughput performance (that is the rate at which cells are processed and transmitted) while optimizing memory usage. High throughput performance is generally desirable because ATM architectures are premised on the ability of ATM backbones to process small cells at high throughput rates. Performance bottlenecks in one ATM switch can potentially impact several end-system applications using the switch as is well known in the art.

Further, an ATM switch may need to support dynamic addition and/or deletion of branches from a multicast connection as target end-systems may be added/dropped from the multicast. The additions and deletions may need to be accurately supported while providing high throughput performance and memory optimization.

Another feature which may enhance the acceptance of ATM technology is efficient support for transmission of frames. Frames typically refer to large data packets sent by endsystems such as those in the Internet Protocol environment. A frame is usually broken into small cells suitable for transmission on ATM communications backbones, and reassembled again for use by the end-system. The sequence of cells which form a frame usually travel one after the other along an ATM connection, and the last (end-of-frame cell) of the sequence of cells is marked accordingly in its header.

Accordingly, what is also needed is a method and apparatus which supports the efficient handling (e.g., queuing and scheduling) of frames as well as individual cells in an ATM backbone.

SUMMARY OF THE INVENTION

The present invention is directed to management of queues in the memory of a cell switch, and more particularly to the support of multicast transmissions. A switch in accordance with the present invention maintains a separate queue for each branch of the multicast connection so that each branch can be served according to the specific service parameters it is set up with. In the case of a multicast connection, several multicast cells are received from a source end-system. Each cell received on the multicast connection is transmitted on several output branches to achieve the multicast function. Transmission on each output branch may correspond, for example, to transmission out of a port of the switch.

It is noted that a unicast transmission can be treated as a multicast transmission with a single branch in accordance with the present invention. Accordingly, transmission of multicast cells and unicast cells can be implemented in a substantially uniform framework.

The present invention minimizes the amount of required memory while processing multicast cells. Only a single copy of the multicast cells is saved forming a physical queue. Several logical queues are defined (one for each output branch for the multicast) based on the physical queue. The logical queues are processed to schedule and transmit packets on each output branch. Also, the present invention minimizes the processing required upon the arrival of a new cell on a multicast connection. Such minimization enables an increased throughput performance in a switch of the present invention.

In one embodiment, queues are achieved by using a linked list structure, which defines the order (cell order) in which multicast cells are received on the multicast connection. A head pointer is maintained for each logical queue (output branch). Packets are transmitted on each output branch by traversing the linked list using the head pointer of the corresponding output branch.

Even though a head pointer is provided for each output branch, the tail pointer is shared by all the logical queues. Thus, when a new cell is received on a multicast connection, only one tail pointer needs to be updated. As a result, additional cells can be added with minimal processing, which may result in a higher throughput performance of an ATM switch in accordance with the present invention.

The storage area used for storing a multicast cell needs to be freed once the cell is transmitted on all desired output branches. A mask is associated with each stored cell which indicates any additional output branches on which the stored cell is to be transmitted. In one embodiment, a bit (in a mask for a cell) is associated with each branch. A bit (e.g., zero value) indicates whether the corresponding cell has been transmitted on the associated branch. Examination of all the bits of a mask indicates whether the associated cell has been transmitted on all desired branches. Such indication is a necessary condition before the storage area storing the cell is freed (or made available for storage of other cells).

However, inconsistencies can result upon sole reliance on the examination of the bit mask. For example, consider a multicast connection where one of the output branches is dropped during the lifetime of the connection. Then, the first location in the linked list after the drop point (i.e., the cell location storing the first cell received after the dropping of the branch) may be reached last by the dropped branch, and before the dropped branch reaches this first location, this first location may be freed (due to all zero mask) and be reallocated to an unrelated connection. As the bit mask may have changed corresponding to the unrelated connection, the cells of the unrelated connection may be erroneously transmitted on the dropped branch.

This problem is solved by associating a drop count with the first cell received after dropping. For simplicity of implementation, a drop count can be associated with all the stored cells. The drop count indicates the number of branches dropped minus the number of branches added between the time a previous cell (of the connection) is received and the time the present cell is received. If no branches are dropped between a previous cell and a present cell, the drop count of the present cell is set to zero. When a branch encounters a first zero in a port mask bit sequence while traversing the link list, the drop count is decremented before deactivation of the branch. A cell location is freed only when the port mask is all zeros and the drop count is zero.

Another problem may result if an output branch having cells to be transmitted ("pending cells") is dropped and added again before all of the pending cells are processed. Rejoining the branch before pending cells are processed can result in cells arriving after branch drop remaining unprocessed. This problem is avoided by having the rejoining branches wait until all the pending cells prior to the drop for that branch are processed before addition of the branch. Specifically, a status bit indicates whether a branch has any pending cells. Once the pending cells are processed, the branch becomes inactive or terminates. The branch is added back only after such termination of the branch as indicated by the status bit. The value of the status bit may be ascertained by software before permitting a rejoin of branches.

According to another aspect of the present invention, the mask is changed only at frame boundaries when cells forming frames are being received on a multicast connection. That is, the same port mask is maintained for all the cells of a frame even if branches are added or deleted while receiving the intermediate cells of a frame. In one embodiment, a memory stores a mask and a drop count to be used for the next frame. The mask and drop count are updated in the memory to correspond to branch additions and deletions. However, the mask and drop count in the memory are used (or associated with cells) only for cells of a subsequent frame.

Maintaining the same mask and drop count for all cells of a frame allows an ATM switch to buffer all cells of a frame until the last cell of a frame is received, and then transmit the whole frame to a consistent set of branches. All the cells may then be transmitted in quick succession. Such an approach can provide accurate processing multicast communication at a frame level in the face of dynamic addition and deletion of branches, and avoid unneeded transmission of partial frames in congested conditions in switches down the branches path.

According to yet another aspect of the present invention, cells of any incompletely received frames are flushed. That is, if an end-of-frame cell (last cell of a frame) is not received (or determined unlikely to be received), the present invention provides an efficient way to delete any cells of the partial frame without transmission on branches. To this end, a garbage queue (preferably organized as linked list) is maintained. When a partial frame needs to be discarded, the cells of the partial frame are appended to the garbage queue using the pointer to the first cell of the frame (stored otherwise also for scheduling purpose) and the tail pointer of the connection. The cells in the garbage queue are deleted (or memory location freed) preferably when the switch is relatively less busy processing valid cells.

In addition to adding the cells of partial frame to the garbage queue, the tail pointer of the connection may need to be set to a proper value for addition of new frames. In one embodiment, pointer information for the last cell of the previous frame is stored (remembered), and the tail pointer of the connection is set to the stored pointer. This generally results in the accurate addition of cells of new frames next (in the linked list order) to the last cell of the previously received complete frame. However, this scheme requires additional memory and processing and is thus undesirable.

In an alternative embodiment, the tail pointer of the connection is set equal to the pointer (which may be stored otherwise for scheduling purpose) to the first cell of the incomplete frame. Only the second cell onwards are added to the garbage queue. Thus, the connection may have an extra cell (first cell of the incomplete frame) in the branch queue. The cell may be indicated to be a end-of-frame cell also, which will result in the cell being eventually dropped without being forwarded to an end-system.

Thus, the present invention minimizes the amount of memory space required for processing multicast transmissions. This is achieved by maintaining only a single copy of the cells and associated cell order and defining several logical queues based on the single copy and cell order.

The memory requirements are further minimized because the tail pointer is shared by several logical queues.

The throughput performance of an ATM switch in accordance with the present invention may also be enhanced as only the shared tail pointer may need to be updated upon the reception of a cell on a multicast connection.

The present invention frees the cell storage locations storing cells transmitted on all branches so that the freed locations can be used for storing newly arriving cells. This is achieved by using a mask for each cell indicating any ports on which the cell needs to be transmitted.

The present invention eliminates inconsistencies which may result by reliance on mask alone in freeing the cell storage locations. This is achieved by maintaining an associated port count when any output branch is dropped.

The present invention ensures that rejoining of branches occurs without inconsistencies by suspending the rejoin operation until any pending cells (i.e., cells in queue at the time of drop) for the branch are processed (or scheduled for transmission).

The present invention queues cells of a frame to enable the cells to be buffered until an end-of-frame cell is received. The discard policy for cells can be simplified because all switches down the branch path may have all the cells for a frame in quick succession. In addition, the buffering requirements are also minimized in switches down the branch path.

By maintaining the same mask and drop count for all cells of a frame, a switch of the present invention may provide for accurate (consistent) addition and deletion of branches from a multicast connection.

The present invention allows cells of any incomplete frames to be discarded. This is achieved by maintaining a garbage queue into which cells of an incomplete frame are added.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIGS. 6A–6D are diagrams illustrating a problem associated with dynamic addition and deletion of output branches in an embodiment of the present invention;

FIGS. 7A–7C are diagrams illustrating another problem associated with dynamic addition and deletion of output branches in an embodiment of the present invention;

DETAILED DESCRIPTION OF THE PREFERRED EMBODIMENTS

Figure 1:
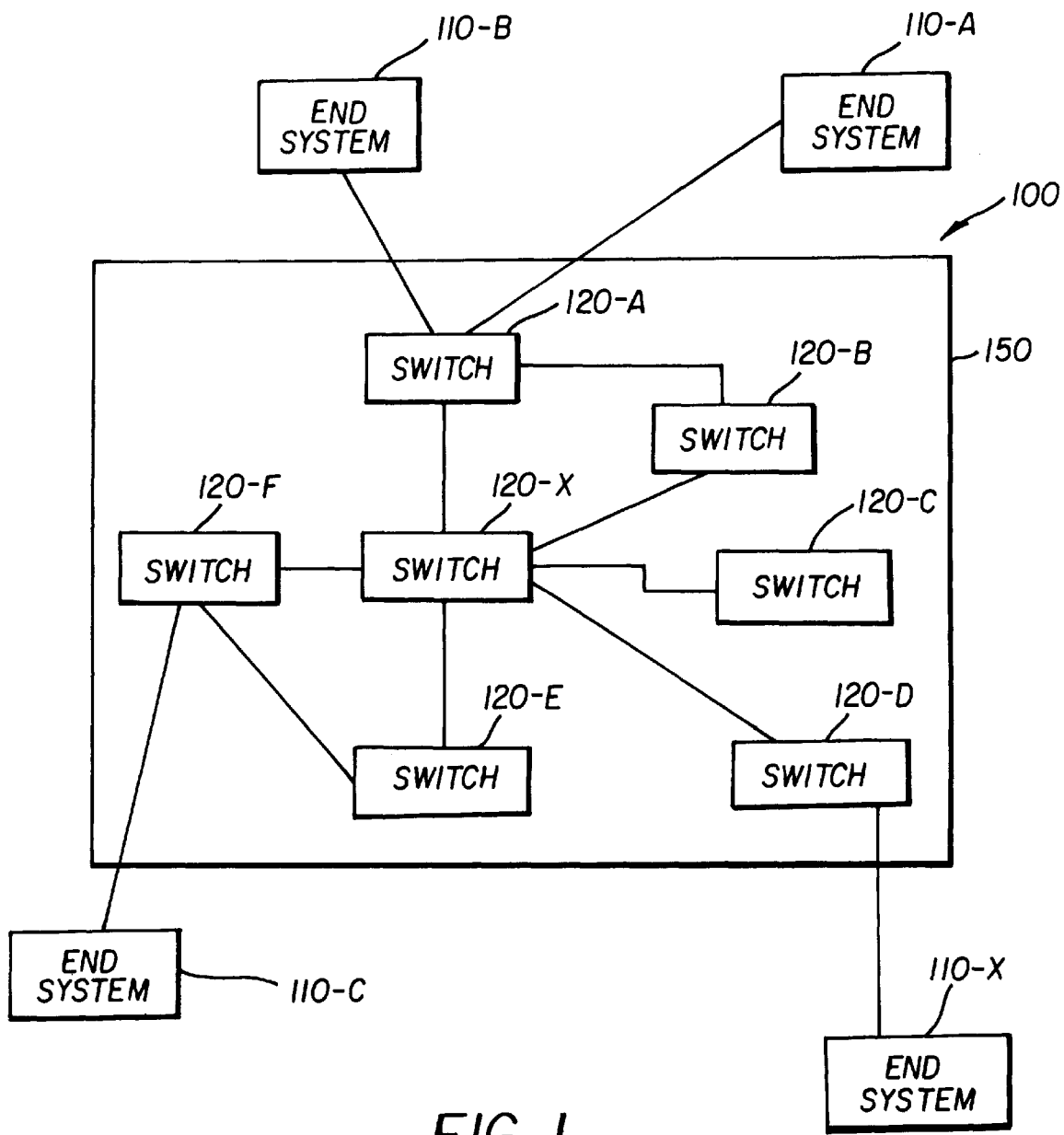
FIG. 1 is a block diagram illustrating an example environment in which the present invention can be implemented.

1. Overview and Discussion of the Invention

The present invention will be described with reference to communication network 100 of FIG. 1, which is a block diagram illustrating an example environment in which the present invention can be implemented. Communication network 100 includes ATM network (backbone) 150 connecting end-systems 110-A, 110-B, 110-C, and 110-X. ATM network 150 includes ATM switches 120-A, 120-B, 120-C, 120-D, 120-E, 120-F, and 120-X. Collectively or individually the end-systems will be referred by reference numeral 110 as will be clear from the context. Similarly, switch 120 will refer to either one of the switches or to the group as a whole.

For purpose of illustration only, a simple communication network environment is depicted in FIG. 1. In reality, communication networks can include several thousands of end-systems. As used in the present application, an end-system refers to any system connecting to a switch of a communication network 100 according to a pre-specified protocol. Examples of such end-systems include, but not limited to, ATM routers of data networks (which aggregate traffic from several computer systems), PBXs of voice networks (which aggregate traffic from several telephone systems), and a computer system which communicates directly with an ATM switch. Similarly, ATM network 150 can also include several thousands of switches 120. In fact, ATM network 150 can span several networks, in turn connected by switches.

The present invention can be implemented in one or more of switches 120, and is described in further detail below. Switches 120 provide multicast support for any cells received on a multicast connection while minimizing the internal memory requirements. Each multi-cast cell can be either one of a sequence of cells related to a frame or independent cells (i.e., having no such relationship). In addition, the present invention supports dynamic addition and drops of branches forming the multicast transmissions. In addition, the processing overhead due to such minimization is minimized in accordance with the present invention.

2. The Present Invention

Figure 2:
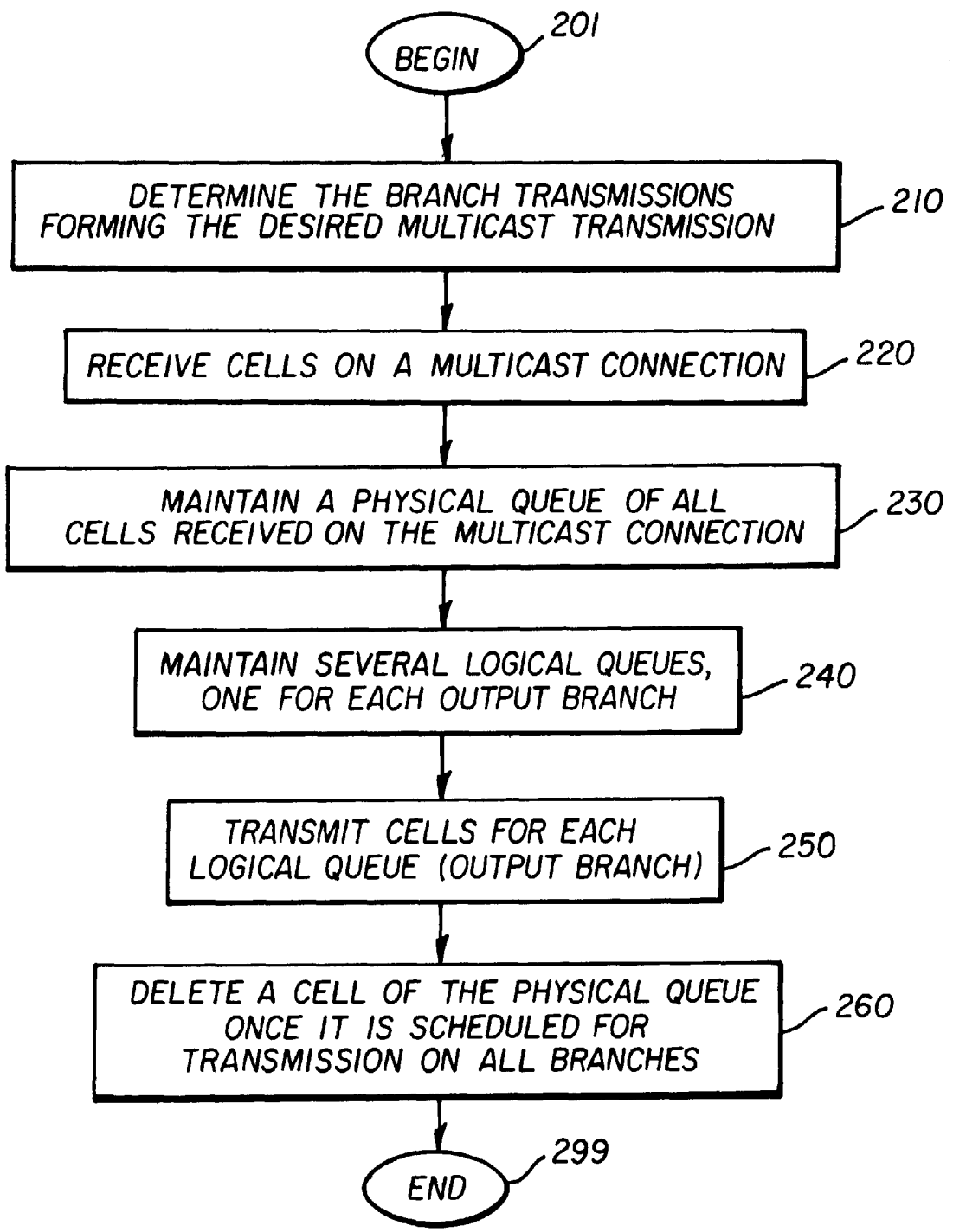
FIG. 2 is a block diagram illustrating the method of the present invention.

The present invention is explained with reference to the flow-chart of FIG. 2. In step 210, the output branches forming a multicast connection are determined. Such a determination is generally made according to the signaling schemes employed in communication backbone 150. In step 220, the cells corresponding to the multicast connection are received in the switch. In step 230, the switch stores the received cells in an internal memory. The cells are buffered in the internal memory until they are processed. Typically, the cells are buffered while they await their individual turn to be transmitted.

In step 240, a switch in accordance with the present invention maintains several logical queues, one for each output branch. A logical queue is typically implemented as a data structure to provide a view of multiple copies of the cells stored in step 230. Several implementations for maintaining the logical queues will be apparent to one skilled in the relevant arts based on the description herein. An embodiment for implementing such logical queues is described below in detail.

In step 250, each logical queue is traversed, preferably independently of other logical queues. Traversal of a queue refers to the general process of examining each cell according to a sequence defined by the chosen queue structure, and transmitting (or otherwise disposing of the cell) the cell according to the processing scheme implemented by the switches. In one embodiment, all queues are implemented as a FIFO (first-in-first-out) queues. Accordingly, the cells in logical queues are examined in the same sequence as in which they have arrived. The sequence of cell arrival is also referred to as cell order herein.

Once all the logical queues traverse a particular cell (i.e., transmit the cell), the cell may be deleted from the physical queue so that the memory space is available for processing other cells. Thus, in step 260, the memory space is freed by deleting the cells in the physical queue. Errors in accurate deletion can cause memory space to remain unused for extended periods of time, leading to a degradation in the performance of the switch. Some problems encountered in an example implementation and the manner in which these problems can be avoided is explained below.

As only one physical copy of all the cells is maintained for many queues, the memory space is optimally utilized. An example implementation of the present invention is described in detail below. The implementation can be appreciated well with an understanding of the logical processing or flow of cells in a switch according to the present invention. Therefore, the logical processing of received cells will be explained first.

Figure 3:
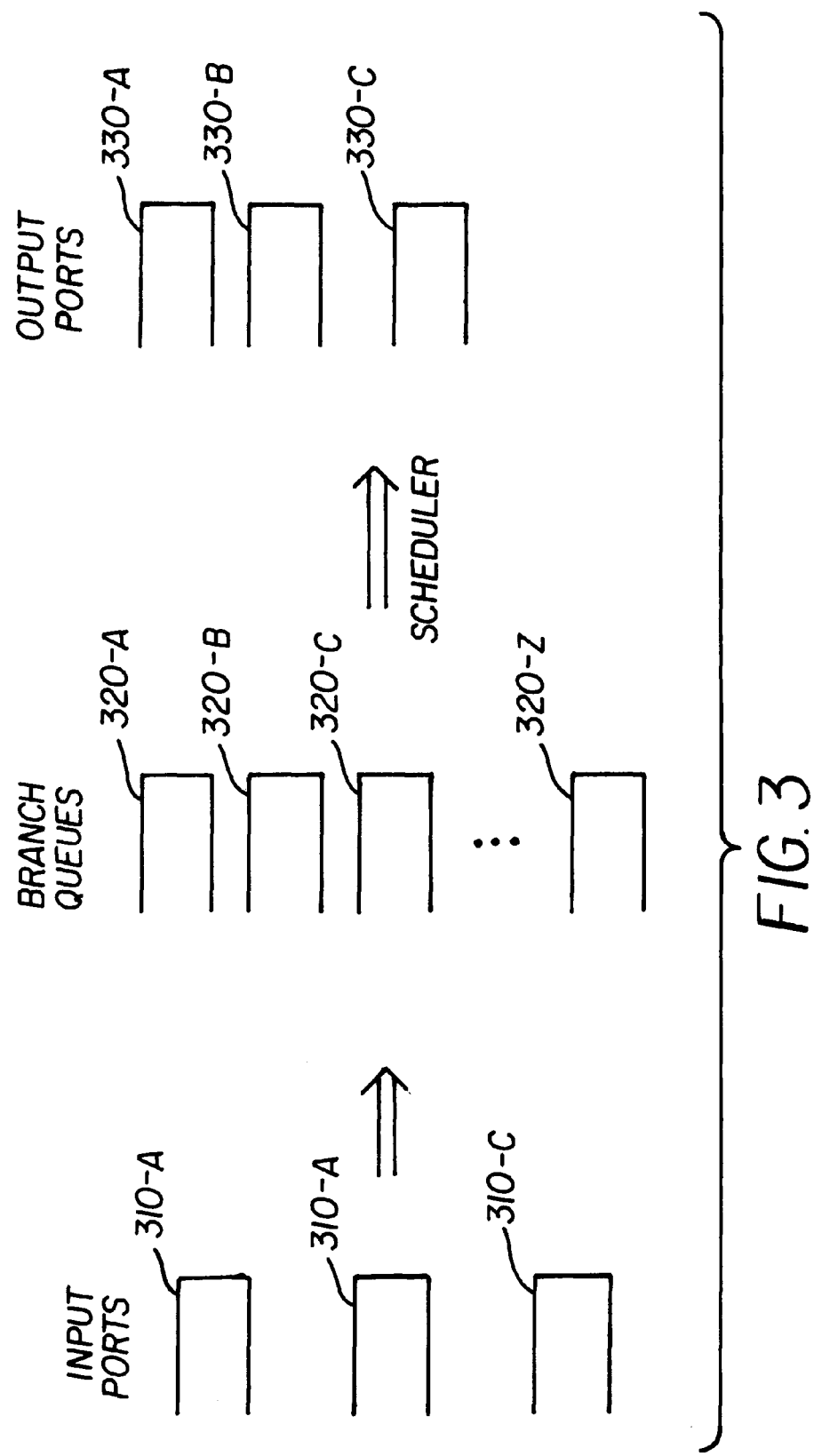
FIG. 3 is a diagram illustrating the flow of cells in different queues in an embodiment of the present invention.

3. Logical Flow of Received Cells in a Switch According to the Present Invention Broadly, switch 120 receives a cell with a given VPI/VCI value on a port, and transmits the cell contents on one or more ports, depending on whether the cell is a unicast cell or a multicast cell. The logical processing or flow of the received cells will be explained with reference to FIG. 3. Cells are received on ports 310-A, 310-B and 310-C, collectively or individually referred by numeral 310 as will be clear from the context. The received cells are placed in branch queues 320-A through 320-Z referred to by numeral 320. The cells in branch queues 320 are scheduled according to a desired scheduling scheme and transmitted on output ports 330-A through 330-C referred to by numeral 330.

Each branch queue 320 stores cells corresponding to an output branch. As will be appreciated, when a multicast cell is received from one of input ports 310, the cell needs to be placed into several branch queues, one for each output branch. By transmitting each cell on the multiple output branches, multicast function is generally achieved. On the other hand, for unicast transmissions, a single branch queue will be present.

It should be understood that a multicast function, as viewed from end-systems, can be supported by multiple transmissions at any of the intermediate systems. For example, with reference to FIG. 1, a multicast cell from end-system 110-X to end-systems 110-A and 110-B may be transmitted on two output branches only at switch 120-A. On the other hand, the same function can be achieved by having switches 120-E or 120-D send transmit the cells on two branches.

Sending the cell on two separate branches in the earlier switches of a branch path generally leads to more traffic in communication backbone 150. However, separate branches may be maintained in earlier switches, for example, because a later switch may not have the ability to support the multicast function.

With reference to FIG. 3 again, a scheduler schedules cells from each branch queue 320 on port 330. The scheduler can have the ability to process different output queues with different priorities. For example, a cell of a first queue may be placed in an output queue ahead of another cell of a second queue even though the another cell may be received earlier. Accordingly, maintaining a queue for each branch provides a switch the ability to serve each output branch according to the service parameters with which it is set up. For example, a branch may be requested with a bandwidth of 9.6 Kbps, and the scheduler may ensure that the branch receives the requested 9.6 Kbps bandwidth.

The implementation of branch queues is achieved by storing the cells in a memory storage. Additional data may also be stored to provide a logical organization (e.g., FIFO queue) to the cell data. As already pointed out, supporting multicasts may entail placing a received cell into several branch queues so that each branch queue can be served independently (e.g., by different ports) and according to any specified service levels (QoS parameters).

Suppose a cell is copied several times to be placed into a corresponding number of branch queues. Such multiple copies may require unacceptably high amount of memory space in an ATM switch. The amount of memory required may be minimized in accordance with the present invention. Specifically, only one physical copy of the cell data is maintained in memory and several logical copies are created. In addition, the addition of a new cell on a multicast connection only requires addition of the cell to the physical queue. The logical queues structure is chosen such that the addition of a cell into a physical queue automatically adds the cell on all logical queues. This reduces the processing steps required for addition of a cell, thereby increasing the throughput performance of an ATM switch in accordance with the present invention. In addition, the invention cab be extended to efficiently process a sequence of cells related to a frame. An example implementation of the present invention is described below.

4. Example Implementation of an ATM Switch According to the Present Invention

For an understanding of the architecture and operation of the implementation, it is helpful to know that basic to ATM architecture is that each cell contains 53 bytes of data, of which 5 bytes are used as header and 48 bytes are used as payload (actual application data using ATM backbone). The header contains virtual path identifier (VPI) and virtual channel identifier (VCI) fields. These fields, along with the port on which a cell is received, are used identify the branch(es) to which the cell relates to. For a detailed understanding of ATM, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith. The relationship between connections and VPI/VCI values is determined during the connection setup process. The manner in which these values are used to process multicast cells in accordance with the present invention will be clear from the description below with reference to FIG. 4.

Figure 4:
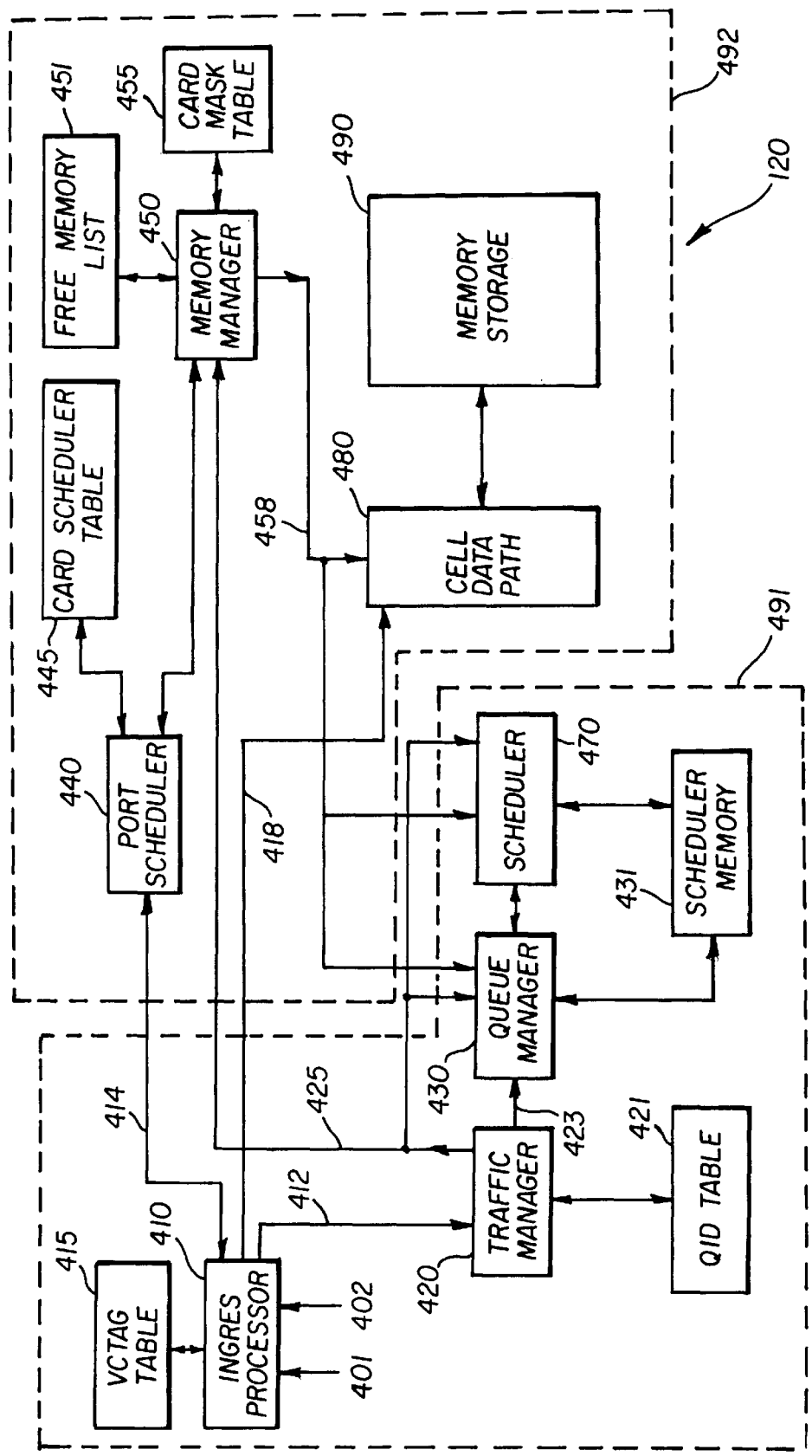
FIG. 4 is a block diagram illustrating an example implementation of a cell switch in accordance with the present invention.

FIG. 4 is a block diagram illustrating an example implementation of switch 120 in accordance with the present invention. Switch 120 includes port card 491 and central block 492. Port-card 491 includes a few ports, with each port sending and receiving cell data. In the embodiment here, ingress processor 410, traffic manager 420, queue manager 430 and scheduler 470 are shown provided within (or dedicated to) port-card 491. Port scheduler 440, memory manager 450, cell data path 480 and memory storage 490 are shown in central block 492. The components in central block 492 coordinate the operation of components in all the port cards. Each component block of switch 120 is explained in detail below.

Ingress processor 410 receives ATM cells according to a pre-specified protocol on lines 401 and 402 from individual ports (not shown). In one embodiment, the cells are received using the UTOPIA protocol known well in the industry. According to this protocol, information is received as to which port a corresponding cell is received on. The received port and VPI/VCI information in a cell are used to identify the input multicast connection. The input multicast connection is identified by VCTAG. VCTAG table 415 stores the information necessary for determining the VCTAG for a received cell based on VPI/VCI and port information. When a new connection is opened, ingress processor 410 updates the information in VCTAG table 415. Ingress processor 410 determines VCTAG corresponding to each received cell by examining VCTAG table 415.

Ingress processor 410 transmits the VCTAG information to traffic manager 420 on bus 412 when scheduled to do so by port scheduler 440. Such scheduling is usually necessary because ingress processor 410 may broadcast VCTAG information to all traffic managers in switch 120, and the bus used for the broadcast may be shared by all ingress processors. In addition, the frequency of examining a port is dependent on the aggregate bandwidth configured for the port. The bandwidth information is stored in card scheduling table 445. Card scheduling table 445 may include information necessary for egress processing as well. Thus, based on the data in card scheduling table 445, ingress processor processes the data received on lines 401 and 402. Ingress processor 410 transmits cell data (including header and payload) to data path 480 on bus 418.

Traffic manager 420 receives the VCTAG information on bus 412 and translates the VCTAG into a QID (queue identifier) by examining QID table 421. QID table 421 stores information corresponding to only the branch queues served by the corresponding port-card. QID uniquely identifies the physical queues maintained by switch 120. In one embodiment, VCTAG is represented by more number of bits than QID, and each VCTAG is mapped to a unique QID. Traffic manager 420 may perform other functions such as determining whether to drop or accept cells.

Upon a determination to accept a cell, traffic manager 420 sends an indication of acceptance to memory manager 450 and queue manager 430 on bus 425. Traffic manager 420 further sends the associated port-card mask to queue manager 430 on bus 423. As will be clearer, scheduler 470 processes the logical queues and cooperates with memory manager 450 and queue manager 430 to ensure that memory space in memory storage 490 is freed once all the logical queues are processed.

Memory storage 490 is used to store cell data. Even though a cell may belong to several output branches, only one copy of the cell is stored in accordance with the present invention. In one embodiment, memory 490 is implemented using a sync SRAM, with each memory word being capable of storing one cell. Cell data path 480 stores and retrieves the cell data in memory storage 490. The address of a cell, where a received cell data is to be stored, is provided by memory manager 450. Cell data path 480 provides other input/output functions such as retrieving the cells in advance so that the data is available when scheduled for transmission on individual ports.

Queue manager 430 manages the queues for each branch (or connection in case of a unicast transmission) enabling scheduler 470 to schedule the cells of each branch stored in memory 490 for transmission on individual ports. In the embodiment(s) described here, the queue management functions and scheduling functions are closely related, and the functions may be integrated as one module. However, it should be understood that some or all of queue management functions can be implemented either as a separate block or integrated with other blocks (e.g., scheduler 470 and/ore traffic manager 420) without departing from the scope and spirit of the present invention.

Queue manager 430 typically needs the addresses of the stored cells for implementing the (physical and logical) queues. The address information may be determined by snooping on bus 458 when memory manager sends address of a free location for storing a newly received cell. By using the address information, queue manager 430 maintains information necessary to determine the cells belonging to each multicast connection and the order of their arrival.

Queue manager 430 determines the ports on which each cell needs to be transmitted. In one embodiment described in further detail below, queue manager 430 maintains a port mask associated with each QID. A table providing the mapping may be stored in scheduler memory 431. The port-mask identifies the output branches (in port card 491) on which the cells of that QID need to be transmitted. As each branch may be associated with a port, the port-mask indicates the specific ports in port-card 491 on which the cells for the corresponding QID need to be transmitted.

For multicast cells to be transmitted on more than one port of a port card, the port-mask will indicate that transmission is required to more than one port. In one embodiment, only one branch of a physical queue can be transmitted on a port, and a bit is therefore maintained for each branch/port. One value indicates that the cells corresponding to the QID need to be transmitted on a corresponding port, and the other value indicates that the cell should not be transmitted on the port. Cells for each output branch are identified by a logical queue. All the logical queues are based on a single physical queue. The maintenance of physical and logical queues in an example embodiment will be described below.

Scheduler 470 can use one of several schemes to determine when each cell of a branch is to be transmitted on a port. It should be noted that cells within a connection are transmitted in the same order (sequence) in which they arrive. However, the same order may not be maintained across cells in different branches as each branch is processed independently based, for example, on the level of congestion present at the corresponding port. The same order may not be maintained across cell in different branches being transmitted on the same port also as each branch may be processed according to the specific service parameters with which the branch is setup. An embodiment for scheduling various branches is described in RELATED APPLICATION 1.

Queue manager 430 associates the port mask identified with the QID with each cell to be transmitted. As a cell is scheduled for transmission on a port, the port mask for the cell is updated to indicate that the cell does not need to be transmitted for that port/branch. Once a cell is transmitted on all ports/branches indicated by the port-mask, a completion message is sent to memory manager 450. The data structures maintained by queue manager 430 in one embodiment for maintaining and processing the logical queues is described below in detail. The manner in which output branches can be dynamically added and/or dropped from the multicast output branches is also described below.

Memory manager 450 keeps track of the free locations available for storing the received cells. Free-list memory 451 is used to store the necessary information. In one embodiment, the free-list is maintained as a linked list. A head pointer and a tail pointer are maintained, with the tail pointer being updated each time a free location is added and the head pointer being updated when a free location is provided for storage of a newly arrived cell. This maintenance scheme will be apparent to one skilled in the relevant arts by reading the description herein.

Memory manager 450 determines an address for storing newly arrived cells if an acceptance signal is received from any traffic manager 420. As noted above, the address is used by cell data path 490 to store the cell data, by queue manager 430 to maintain queues, and by scheduler 470 to schedule cells in each of the queues.

Memory manager 450 maintains information identifying all traffic managers (in switch 120), which have indicated acceptance of a received multicast cell. This information may also be stored as a card mask for each multicast cell in multicast table 452. Card mask for each multicast cell is updated upon receiving an acceptance signal for the corresponding cell from each traffic manager. Once all the card ports indicated by card mask send a completion signal (message), memory manager 450 updates the free-list memory 451 to indicate the availability of the memory location storing that given cell. In the case of a linked list implementation, the freed location is added to the tail.

Thus, switch 120 is described as having several component blocks, with each block performing certain functions. However, it should be understood that the functions are described with reference to each block for illustration purpose only, and some of the functions can be varied among the blocks as will be apparent to one skilled in the relevant arts based on the description herein. For example, the maintenance of port masks can be performed by traffic manager 420 instead of queue manager 430.

Also, even though the components of FIG. 4 are shown either as dedicated or shared (port cards), it should be understood the central functions can be more distributed, and some of the dedicated functions can be centralized depending on the available technologies, price/performance goals etc. For example, the card mask and port mask can together be implemented as a single mask, with each mask identifying all the branches in switch 120 on which a cell needs to be transmitted. Similarly, the pointers identifying the cell order can also be maintained centrally (as opposed to at each queue manager 430).

Thus, a single copy of each received cell is maintained in accordance with the present invention even though the cell data may be transmitted several times for multicast transmission. As noted above, each queue manager 430 maintains the information necessary for maintaining logical queues based on a single physical storage, which enables multiple transmissions based on a single copy. An example scheme used by queue manager 430 to maintain and process the logical queues is explained below.

5. Example Scheme for Maintaining and Processing Logical Queues

An example scheme including data structures (stored in scheduler memory 431) used by queue manager 430 is described with reference to FIG. 5. Physical queue pointer table 510 is shown with pointer locations 510-A through 510-L for illustration purpose. In reality, physical queue pointers 520 typically include a number of locations equal to the number of cells that may be stored in memory 490. The pointers in physical queue pointers 520 identify the cells stored in memory 490 and the order (cell order) in which they are received. This is illustrated with an example in FIG. 5, in which storage locations 520-A through 520-L represent memory locations in memory 490 where cell data is stored. Location 510-A points to location 510-C, which in turn points to 510-D, which points to location 510-L, which points to location 510-H. Thus, the cell data stored in corresponding memory storage locations 520-A, 520-C, 520-D, 520-L and 510-H form a sequence of cells received (in that order) on a multicast connection. The sequence of these stored cells forms a physical queue.

Several logical queues are defined based on the stored physical queue. Each logical queue corresponds to an output branch of the desired multicast connection. As will be readily appreciated, the cell data need not be duplicated for each logical queue, and memory savings may be achieved. Each logical queue is processed to transmit cells on an output branch. Multicasting is achieved by transmissions of cells on all such output branches.

A logical queue is defined by a head-pointer and a tail-pointer to the stored physical queue. All the logical queues based on a single physical queue can share a single tail-pointer, which will require the updating of only a single pointer on the addition of a new cell received on a multicast connection. The tail pointer identifies the storage location of the last cell received on a connection. Compared to a scheme in which a tail pointer is maintained for each branch, considerably less processing steps may be performed by switch 120 when a multicast cell is added in a shared tail-pointer based scheme. Accordingly, switch 120 may have a high throughput performance. In addition, the memory requirements are also minimized because of the sharing of the tail pointer.

As each logical queue is traversed (by scheduler 470) in the cell order, the head-pointer corresponding to that logical queue is updated to reflect the processed cells for that branch. Thus, a head pointer for a logical queue points to the next cell to be processed in the cell order for that logical queue (branch).

Figure 5:
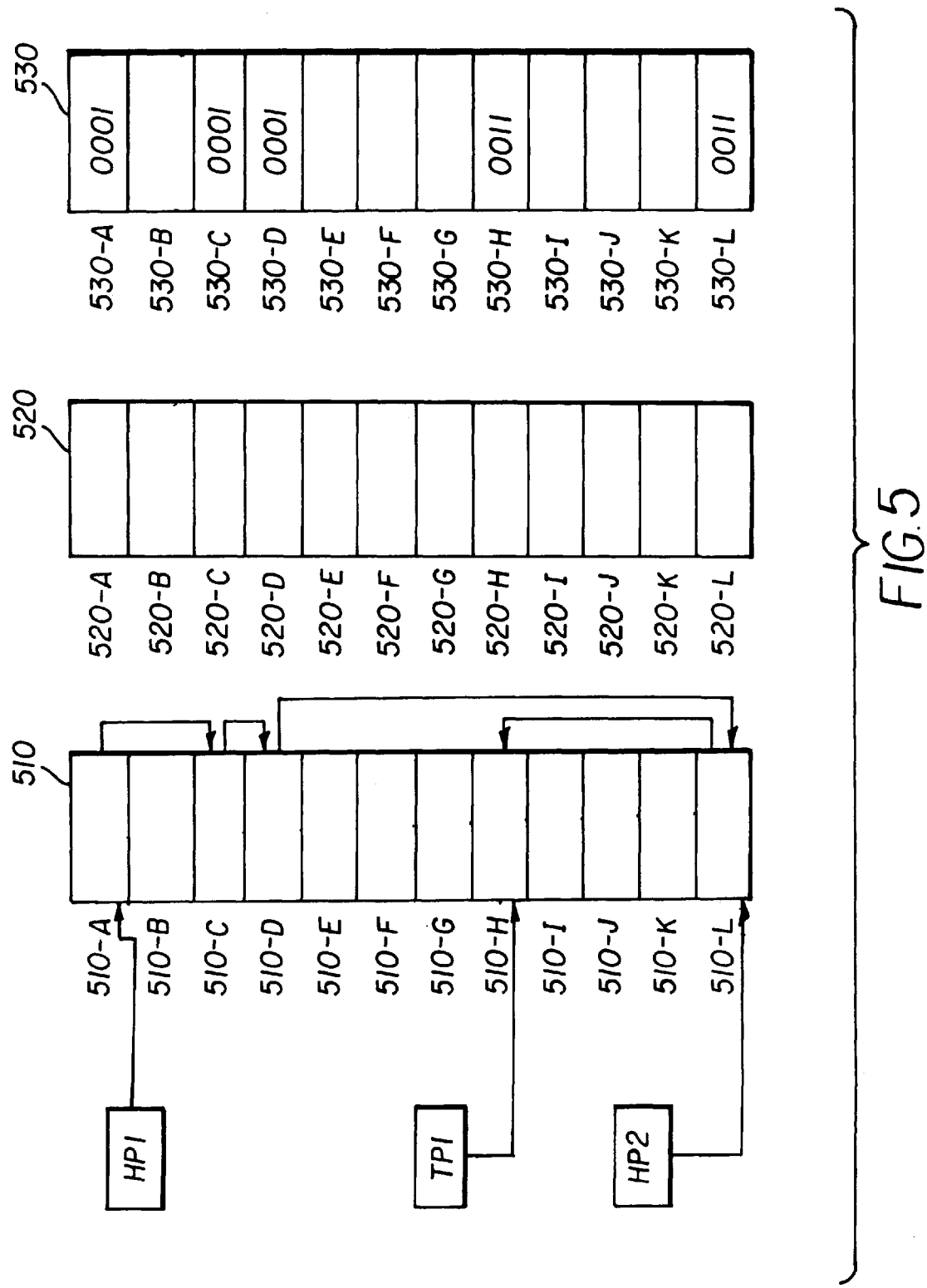
FIG. 5 is a block diagram of the data structures used by an embodiment of the present invention to maintain and process several logical queues based on a physical queue, with each logical queue corresponding to one of several output branches forming a multicast transmission.

As an illustration, FIG. 5 illustrates the manner in which packets received on a multicast connection are stored and processed. The multicast connection has two output branches (1 and 2) defined by head-pointers 1 and 2 (HP1 and HP2) respectively. The two branches share tail pointer TP1. Each logical queue (branch) can be processed independent of other logical queues. To schedule packets on a logical queue for transmission, scheduler 470 traverses the linked list using the corresponding head pointer, and schedules each traversed cell for transmission. In FIG. 5, the cells corresponding to logical queue 2 are processed at a higher speed, and accordingly head pointer 2 points to a later cell (510-L) in the cell order. The processing of logical queue 1 is behind by three cells (510-A, 510-C, and 510-D) in this illustration.

A tail pointer is defined for each physical queue and is shared by all logical queues corresponding to the same connection. Thus, tail pointer 1 (TP 1) identifies the last cell stored for the physical queue. For simplicity, only one physical queue is shown in FIG. 5. Typically, up to several thousands of connections can be maintained by queue manager. When a new cell is added, for example, in storage location 520-F, pointer 510-H points to 510-F, and tail pointer 1 points to 510-F.

Port-mask table 530 is used to identify the branches on which each cell in a physical queue is to be transmitted. In one embodiment, each port can have only one branch of a multicast connection associated with it. Accordingly, port-mask table 530 identifies the ports on which the corresponding cell is yet to be transmitted. Thus, with reference to the queues illustrated in FIG. 5, assuming that branches 1 and 2 are to be transmitted on ports 1 and 2 respectively, port masks 530-A, 530-C and 530-D are shown with a mask of 0001 indicating that corresponding cells 520-A, 520-C and 520-D are to be transmitted on port 1 only (i.e., output branch 1). On the other hand, the port masks 530-H and 530-L have a value of 0011 indicating that the corresponding cells are to be transmitted on ports 1 and 2 respectively.

As a cell is transmitted on a port, scheduler 470 updates the corresponding port mask entry to reflect that the cell does not need to be transmitted on that port. Once all the entries of a port-mask equal zero, the corresponding cell data is no longer needed. Accordingly, queue manager 430 provides an indication to memory manager 450. Upon receiving similar indication from all queue managers in switch 120, memory manager 450 makes the corresponding storage location available for newly arriving cells.

Thus, using the port mask table 530, queue manager 430 maintains several logical queues based on a single physical queue. The port mask based scheme described above may be adequate in situations where output branches are not dynamically added or dropped from multicast output branches set. Unfortunately, end-system applications typically require dynamic addition or deletion of output branches. Some problems which may be encountered in the above described scheme due to dynamic addition/deletion of output branches and the solutions in accordance with the present invention are described.

6. One Problem With Dynamic Additions and Deletion of Branches

Figure 6A:
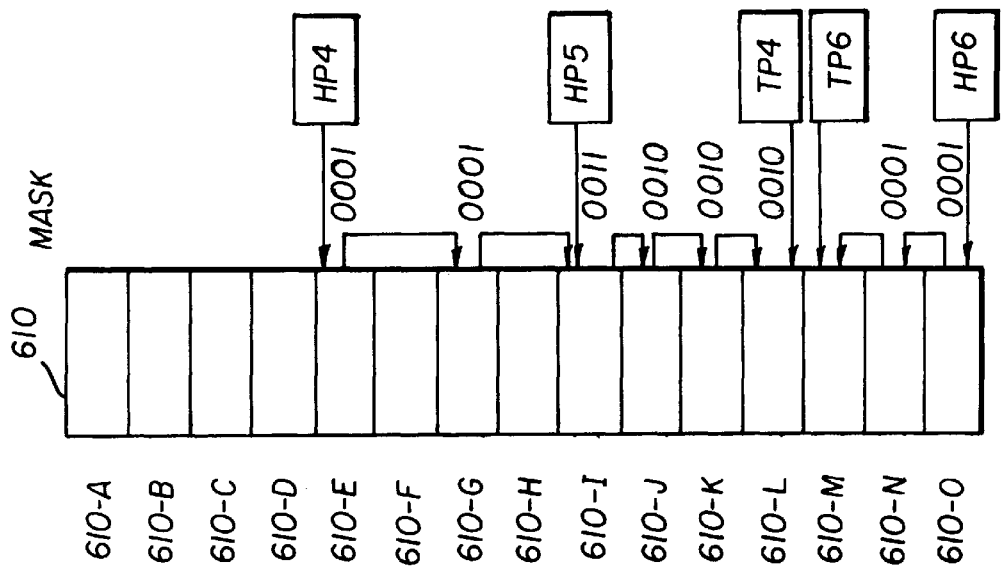

One problem is explained with reference to FIGS. 6A–6D, which illustrate the status of the pointers as a function of time. FIG. 6A shows cell storage locations 610-A through 610-O and the pointers defining cell order (and thus a physical queue). Cell data in locations 610-A, 610-C, 610-E, 610-F and 610-I are received on a multicast connection. The stored cells along with associated pointers define a physical queue.

Tail pointer 4 points to 610-I to indicate the end of the physical queue. Head pointer 4 (HP 4) of output branch 4 directed to port 1 is shown pointing to cell location 610-A, while head pointer 5 of output branch 5 directed to port 2 is shown pointing to cell location 610-E indicating that port 2 has already completed transmitting cell data for locations 610-A and 610-C. Mask values (shown adjacent to each cell) reflect the read status of each cell for all the four ports. Head pointer 6 and tail pointer 6 define another queue (logical queue 6 or branch 6) not related to branches 4 and 5. Branch 6 will be assumed to have a port mask of 0001 (transmit only on port 1) for simplicity.

Figure 6B:
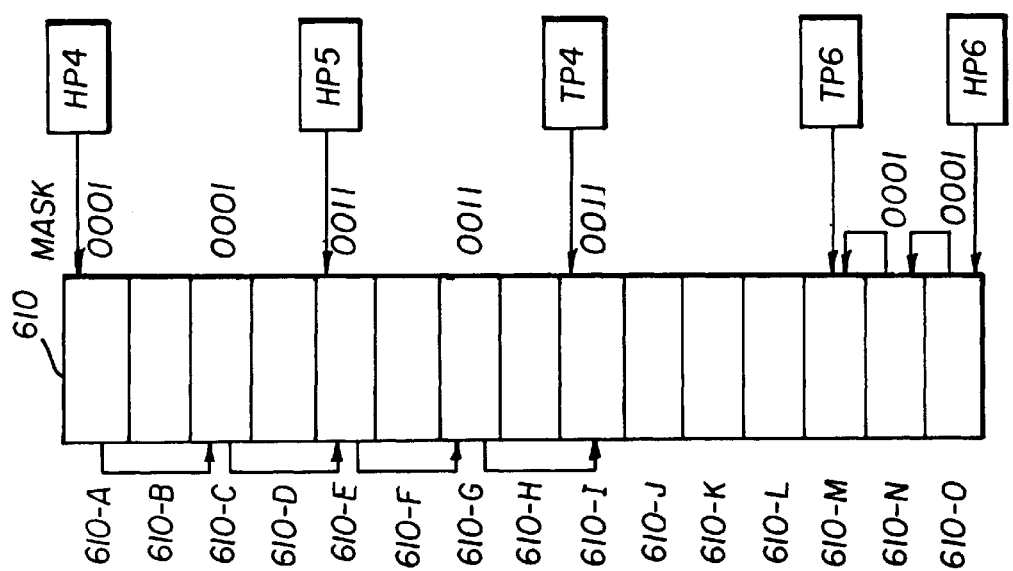

Branch 4 (on Port 1) is assumed to be dropped with the status described in FIG. 6A. FIG. 6B shows the status a short duration thereafter.

During the period between FIGS. 6A and 6B, cell data in locations 610-A and 610-C are read by port 1 of branch 4, and accordingly head pointer 4 is advanced to 610-E. These cells may have been freed as the port mask is 0000, and accordingly no pointers are shown at those locations. New cell data 610-J, 610-K, 610-L are shown to be added in FIG.

6B. As the output branch 4 of port 1 has been dropped at the end of FIG. 6A, a port mask of 0010 (bit for port 1 being reset) is used for these new cells. No change is shown for branch 6 of head pointer 6. Branch 5 on port 2 has completed reading cells 610-E and 610-G, and accordingly bit 2 of the port-mask is shown reset for these two cells.

FIG. 6C illustrates a scenario in which the branch for the dropped port is traversing the linked list last. As head pointer 5 (of port 2) has traversed the locations 610-I, 610-J and 610-K ahead, bit 2 of the corresponding port masks are shown reset to zero. Traversal by branch 4 (port 1) is lagging behind. Accordingly, head pointer 4 is shown pointing to location 610-E, which is a location early in the cell order.

In some situations, branch 4 may traverse the remaining links and terminate properly. That is, branch 4 may traverse cell locations 610-E, 610-G and 610-I to schedule the corresponding cell data, and terminate on encountering a 0 at port mask 610-J.

However, before branch 4 processes location 610-J, the port mask may be changed and may present a problem. While branch 4 traverses locations 610-E, 610-G, and 610-I, location 610-J may be freed for allocation to a newly arriving cell because the port mask is found to be all-zeroes. Assume for illustration that location is allocated to a newly arriving cell for branch 6. Assume further that a later cell for branch 6 is stored at location 610-C. This scenario is represented in FIG. 6D. Tail pointer 4 and head pointer 4 are not shown as they are not necessary for the illustration of the problem.

As can be readily observed from FIG. 6D, cells stored in 610-J may be transmitted on branch 4 or branch 6, depending on which branch gets to processing location 610-J first. Processing by branch 4 would be erroneous and thus undesirable. To summarize the problem, inconsistencies can result if a dropped branch traverses the physical queue last because the location storing the first cell received after the branch is dropped may be erroneously reallocated.

At least to solve the above described problem, an indication that a branch has been dropped is maintained. This indication is in addition to any inference of a branch drop that may be made based on a transition from one to zero in the bit mask sequence for the output branch. In one embodiment, a drop count (as a counter) is associated with the first cell added after a branch is dropped. Thus, in FIGS. 6A–6D, a drop count (not shown in Figures) is associated with cell 610-J (i.e., the cell arriving after the branch is dropped). The drop count is incremented by one for each output branch dropped just prior to cell 610-J. The drop count is decremented by one for each output branch added. For uniformity of implementation, a drop count may be associated with all cells.

When a port (output branch) encounters port mask bit of zero first time, the output branch decrements the drop count (associated with the corresponding cell) by one. Then, the branch may be deactivated. Also, a cell position (in memory storage 490) may be freed only upon the satisfaction of two conditions in this embodiment: (1) port mask needs to be all-zeros, and (2) drop count is zero for that cell position. Upon satisfaction of the two conditions, queue manager 430 sends an indication to memory manager 450.

Due to the use of the additional indication of dropped branches, cell locations are not freed prematurely and the problem described with reference to FIGS. 6A–6D is avoided. The drop count based scheme may not add substantial processing overhead on queue manager 430 because a drop count is examined only upon encountering a first zero in the port mask bit sequence for a port.

7. Another Problem With Dynamic Additions and Deletion of Branches to Multicast Connections Another potential problem is illustrated with reference to FIGS. 7A, 7B, and 7C. In each of these Figures, entries in table 710 include only the port masks. Successive port masks represent successive cells in the cell order. This representation (without pointers) is chosen for an easier understanding of the problem sought to be described. Each of these Figures illustrate the processing of output branch 7 and output branch 8 transmitting on ports 1 and 2 respectively. Port mask is assumed to have two bits to represent the transmission status of each multicast cell for the two ports. Output branch 7 and output branch 8 are defined by head pointer 7 (HP7) and head pointer 8 (HP8) respectively. Both branches share a common tail pointer 7 (TP7).

In FIG. 7, port masks indicate that cells 710-A and 710-B are transmitted by branch 8, but not yet by branch 7. Tail pointer points to 710-E indicating that a total of five broadcast cells (710-A through 710-E) are in the physical queue. After the storage of cell 710-E, branch 7 is shown to be dropped in FIG. 7B. In addition, cells 710-F through 710-H are shown to be added.

In FIG. 7C, branch 7 (port 1) is shown to be added after storing cell 710-H and the port mask used for the new cells is set to 11. Between the drop and add of branch 7, cells 710-F through 710-H are shown added. The added cells have a port mask of 10 reflecting that the cells need not be transmitted on port 1, branch 7. FIG. 7C further shows cells 710-I through 710-N added after branch 7 is added.

Now assuming head pointer 7 traverses the links to process cells 710-B onwards. Once cell 710-E is processed, branch 7 may be terminated (or deactivated) upon encountering a port mask bit of 0 for port 1 (even with the drop count scheme described above). Accordingly, cells 710-I through 710-N may not be transmitted on port 1. As should be readily apparent, this result is undesirable.

At least to solve the problem described with reference to FIGS. 7A–7C, a branch on a port is not added back if the same branch for the same multicast connection is active for the same port (i.e., if the cells are awaiting transmission for that branch). The addition of the new branch is suspended until this branch for the same port terminates in due course. In one embodiment, a status bit is maintained for each port. The status bit indicates whether the branch is actively transmitting on the port. Once the branch terminates in due course (after processing the pending cells as of branch drop time), the status bit is set to indicate that there is no active branch transmitting on the port. The status bit can be ascertained in software, and thus a branch may not be added until the dropped branch terminates in due course.

Thus, with reference to FIG. 7, the port mask for cells 710-I through 710-N will continue to be 10 so long as branch 7 (identified by HP7) is active. Once branch 7 terminates, the port mask is set to 11 to indicate the addition of branch 7. Branch 7 is activated again at when the port mask is set to 11. Accordingly, cells are transmitted on branch 7 accurately.

Therefore, the present invention may enable dynamic addition and deletion of branches when several logical queues (corresponding to branches) are maintained for processing a multicast connection. The schemes of above can be extended to efficiently process cells that form a frame as will be explained below.

8. Queues to Process a Sequence of Cells Forming a Multicast Frame

A broad overview of frame processing is provided first. As noted above, frames refer to large packets which are typically generated by data sources. Each frame is typically broken into small cells suitable for transmission on ATM backbones. The cells are reassembled to form a frame before being sent to the target end-application. LANE (Local Area Networks Emulation) is an example application of such breaking and reassembly. The header of ATM cells include bits to identify the frame boundaries (i.e., first and last cells in a sequence of cells forming a frame).

As described in detail in RELATED APPLICATION 1, all cells forming a frame may be buffered in a queue (connection queue in case of a unicast transmission) until the end-of-frame cell is received, and all the cells of the frame may be transmitted in quick succession. Transmitting all cells of a frame in quick succession generally leads to easier memory management and cell drop policy in switches down the branch/connection path. As may be appreciated a partial frame may not be of much use and dropping all cells of a frame is more desirable than dropping only a few cells because partial frame may be discarded anyway.

Figure 8:
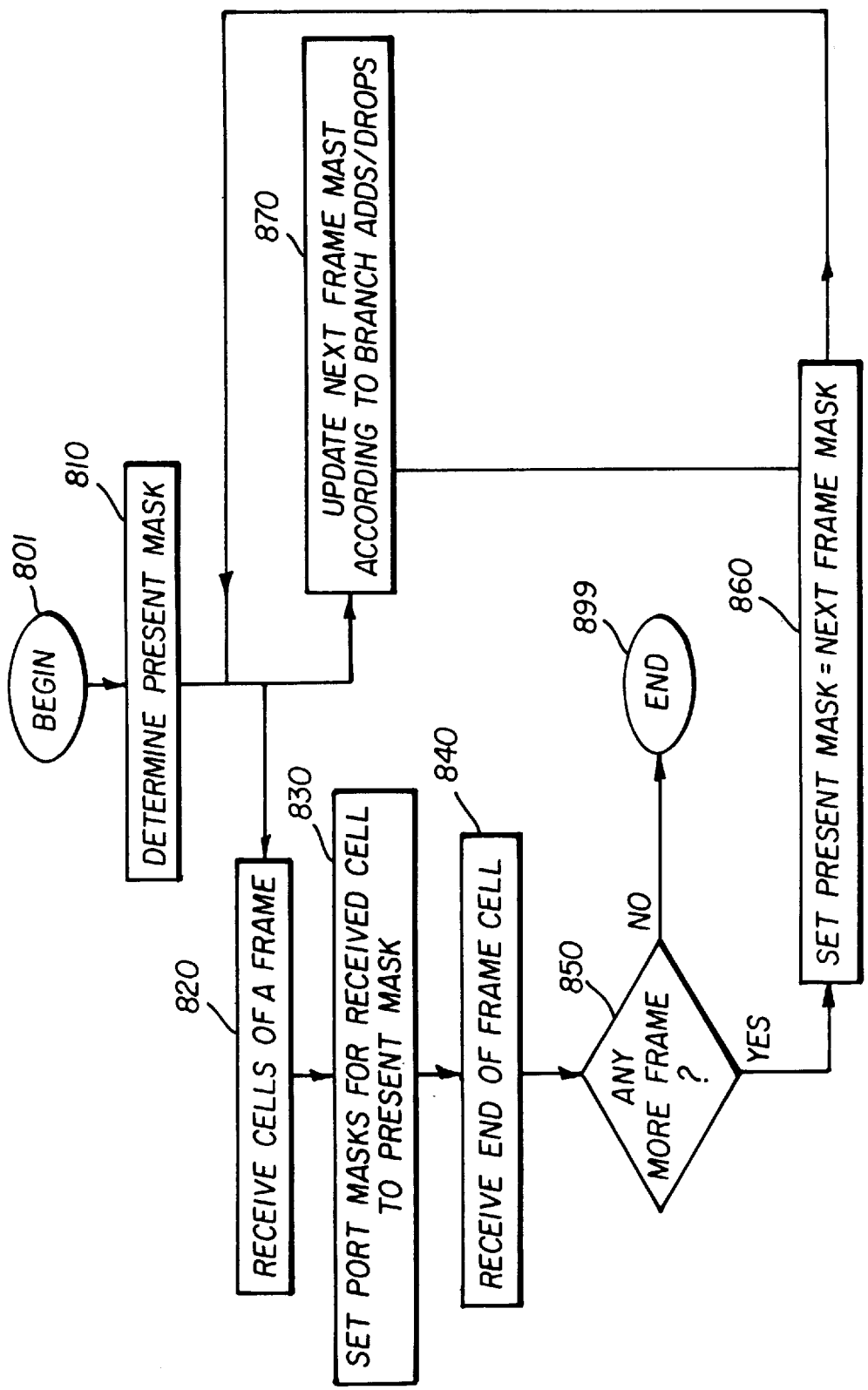
FIG. 8 is a flowchart illustrating the steps performed in maintaining port masks for cells related to a frame.

Thus, in embodiment(s) described in detail in RELATED APPLICATION 1, scheduler 470 uses the port mask associated with the first cell of a frame to determine the branches on which a frame needs to be transmitted. All the cells of the frame are transmitted on only the determined branches. In such a scheduling scheme, it is desirable that the port mask remain the same for all frame cells. Otherwise, the portmasks of cells after addition/deletion of branches may remain at non-zero values, and the cell locations may never be released for use by new cells. Accordingly, the port mask is maintained the same for all cells of the frame as explained with combined reference to FIGS. 4 and 8. Even though the steps will be explained with reference to queue manager 430, it should be understood that some or all of the steps may be implemented in other blocks of ATM switch 120.

In step 810, queue manager 430 determines a present mask for the cells of a frame. The present mask represents the branches (ports) on which cells received on the connection need to be transmitted. The manner in which the present mask will be changed with addition and deletion of branches will be apparent from the remaining steps of the flowchart.

Steps 820, 830, 840, and 850 are shown in a parallel path to step 870 to signify that step 870 is performed in parallel to steps 820, 830, 840, and 850. Step 870 indicates that queue manager 430 maintains a next frame mask at least for each connection (both multicast and unicast) receiving frame cells. The next frame mask is updated to reflect addition and deletion of branches to the corresponding connection. Port mask may be updated, for example, as explained with reference to FIGS. 6A–6D and 7A–7C. The next frame mask is associated with the cells of the very next frame. Thus, the present frame mask is set to the updated next frame mask in step 860.

In step 820, cells of a frame are received. The port mask for each received cell is set to the present frame mask in step 830. Steps 820 and 830 are performed until an end-of-frame cell is received in a cell in step 840. In step 850, a determination is made whether any additional frame will be received on the connection. If there are no additional frames (for example, due to, termination of the connection), the flow-chart of FIG. 8 ends. Otherwise, the present mask is set to the next frame mask updated in step 870, and processing according to the steps in flow-chart continues.

Thus, queue manager 450 in accordance with the present invention may maintain two entries for each connection receiving frames—one for present port mask and another for the next frame port mask. Using these two entries, queue manager 450 may ensure that all the cells of a frame are assigned the port mask. This enables queue manager 450 to wait until an end-of-frame cell is received, and then transmit all cells of a packet in quick succession as explained in RELATED APPLICATION 1.

However, sometimes an end-of-frame cell may not be received, due to for example, transmission problems somewhere earlier in the communication path. For that reason (or due to other reasons), all the stored cells of a frame may need to be deleted without transmission. The manner in which the cells are deleted (or flushed) in accordance with the present invention is described below.

9. Flushing Frame Cells

Figure 9C:
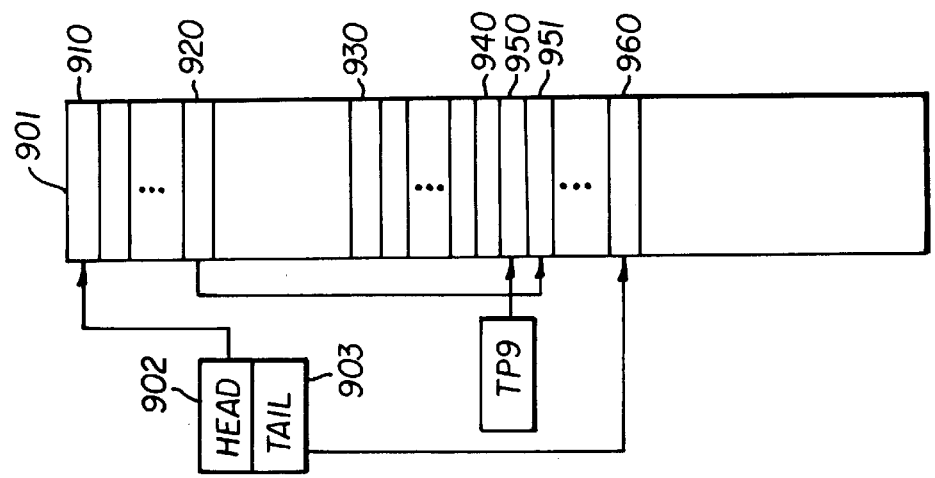
FIGS. 9A–9C illustrate the manner in which incomplete frames can be flushed in accordance with the present invention.

The manner in which cells of a frame can be flushed in accordance with the present invention is illustrated with reference to FIGS. 9A–9C. In these Figures, the cells will be shown to be stored in sequential locations of memory for simplicity. Memory 901 is shown with several locations, Locations 910 (head of the garbage queue) through 920 (tail) contain cells which have been determined to be suitable for flushing. Garbage head pointer 902 and garbage tail pointer 903 store the head pointer and tail pointer respectively of the list of cells that need to be flushed. Thus, cells stored in location 910–920 need to be flushed.

Flushing operation typically involves traversing the garbage list and freeing the memory location storing the cells in the garbage list. The locations need to be freed irrespective of the values in the port mask or drop count of each cell. Flushing operation can be performed as a low priority operation so that the processing of active cells is given higher priority.

Present frame head 990 stores a pointer to the first location of the present frame being received on the subject (multicast or unicast) connection. Thus, present frame head 990 is shown pointing to the first cell 950 of a present frame being received. Tail pointer TP9 points to the last location 960 of the present incomplete frame.

Assume for purpose of illustration that a determination is made that the present incomplete frame needs to be flushed. The determination could be made because, for example, a timer (awaiting the arrival of the end-of-frame cell) has expired. Accordingly, the cells in the present frame need to be flushed. The manner in which flushing may be accomplished is illustrated with reference to FIGS. 9B and 9C.

Figure 9B:
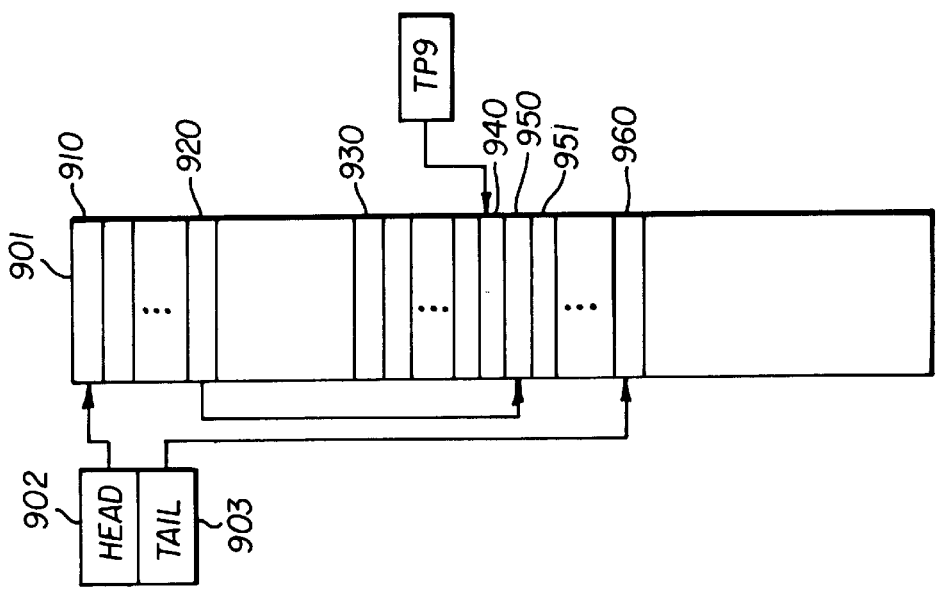
Figure 9A:
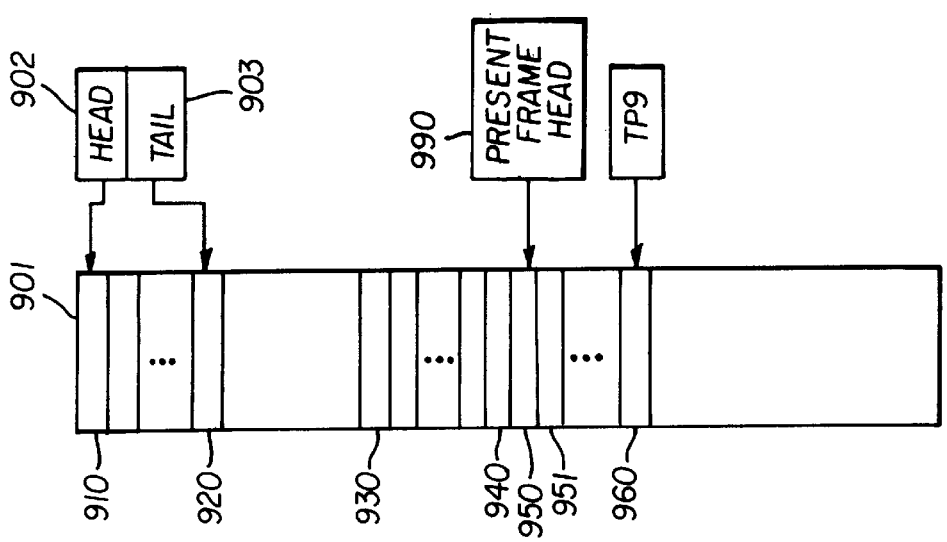

FIG. 9B represents the status of the various pointers to support the flush operation. The cells of the incomplete frame are shown added to the garbage queue. The incomplete frame is tagged to the end of the garbage queue. Specifically, the last location (previous tail) 920 of garbage queue is shown pointing to location 950, the first cell in the incomplete frame. The pointer to location 950 is readily available from frame head pointers memory 990 and is used to set the value in pointer location 920. Garbage tail 903 is set to point to the last location 960 of the incomplete frame. The pointer to the last location is readily available from TP9 of FIG. 9A. In addition, TP9 is set to point to the last cell 940 of the previous complete frame. Thus, the first cell of any newly arriving frame can be stored accurately, with last cell 940 pointing to the location where the first cell is stored.

Unfortunately, setting tail pointer TP9 according to the scheme described above may require storing a pointer to the last location of previously stored complete frame. Such additional storage requirements may be unduly burdensome as switch 120 may maintain a queue for each connection. FIG. 9C illustrates one way to overcome the storage problem.

FIG. 9C represents the status of various pointers to support the flush operation in an alternative embodiment. As will be appreciated, the scheme of FIG. 9C does not require storing a pointer to the last cell of a previously received complete frame for each connection. Only the differences between FIGS. 9C and 9B will be described for conciseness.

TP9 is shown pointing to the head location 950 of the incompletely received frame. Pointer to head location 950 is readily available in present frame head pointer 990. Previous tail 920 of garbage queue is shown pointing to the second location of the incomplete frame. The pointer value is available from head location 950.

Therefore, in accordance with the scheme of FIG. 9C, an extra cell (in location 950) is present in the cell order of the connection. Queue manager 450 may employ different schemes to ensure that the cell is not transmitted on any port. In the alternative, the extra cell may be indicated to be a end-of-frame cell also, which will result in the cell being eventually dropped without being forwarded to an end-system. Thus, using the schemes described with reference to FIG. 9B or 9C, an incomplete frame can be flushed.

Thus, an ATM switch in accordance with the present invention can be used for efficient processing of cells forming a frame. The frames can be either multicast frames or unicast frames.

The present invention minimizes the memory requirements for processing multicasts by using a single physical queue to store cells received on a multicast connection, but by using logical queues for each output branch. The additional processing required due to the maintenance of logical queues is minimized by having all the logical queues share a single tail pointer. The shared tail pointer results in minimization of additional memory requirements also. The present invention allows dynamic addition and deletion of branches from a multicast connection in a consistent manner while maintaining logical queues.

10. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of supporting multicast transmissions in a switch, said method comprising the steps of:

(a) receiving a plurality of multicast cells in a cell order on a multicast connection, wherein each of said plurality of multicast cells needs to be transmitted on a plurality of output branches to achieve a multicast transmission with each of said plurality of output branches being associated with one of a plurality of ports in said switch;

(b) storing said plurality of multicast cells and an associated linked list in a memory, wherein said linked list identifies said cell order;

(c) maintaining a plurality of logical queues with each logical queue corresponding to one of said plurality of output branches, wherein each of said plurality of logical queues is represented by a head pointer pointing to said linked list, and wherein each head pointer identifies a next multicast cell to be transmitted for a corresponding one of said plurality of output branches;

(d) maintaining a port mask associated with each of said plurality of multicast cells stored in said memory, wherein said port mask identifies a set of ports on which a corresponding multicast cell is yet to be transmitted, said port mask being set to indicate when a branch corresponding to a port has been dropped from the multicast connection;

(e) maintaining an indication associated with a multicast cell stored in said memory, wherein said indication indicates whether a branch of said multicast connection has been dropped prior to the reception of said associated multicast cell;

(f) scheduling for transmission said plurality of multicast cells on each of said plurality of logical queues by traversing said linked list using a corresponding head pointer, wherein each head pointer is updated to point to the next multicast cell to be transmitted in the corresponding logical queue, wherein said port mask for each multicast cell is updated to reflect the transmission of the corresponding multicast cell on the branches indicated by the port mask;

(g) determining whether to delete said cell from said memory based on both said port mask and said indication; and (h) deleting said multicast cell if it is determined to delete said multicast cell in step (g).

2. The method of claim 1, wherein step (c) further comprises the step of providing a shared tail pointer for all of said logical queues such that only said shared tail pointer needs to be updated upon the arrival of a new multicast cell on said multicast connection.

3. The method of claim 1, further comprising the step of adding a new output branch on a port, the step of adding said output branch comprising the further step of:

(h) determining whether any prior output branch for the same connection is active on the same port as that on which said new output branch transmits; and (i) waiting until any prior output branches determined in step (h) terminate, and then adding said new output branch.

4. The method of claim 1, wherein said port mask comprises a bit for each of said plurality of ports.

5. The method of claim 1, wherein said plurality of multicast cells include a sequence of cells forming a frame, the method comprising the further step of maintaining the same port mask for all of said sequence of cells even if output branches are added or deleted from said multicast connection during the reception of said sequence of cells.

6. The method of claim 5, wherein said step of maintaining the same port mask comprises the further steps of:

(j) receiving each of said sequence of cells forming said frame;

(k) determining a present mask when setting the port mask for a first one of said sequence of cells;

(l) setting the port mask of each of said sequence of cells equal to said present mask;

(m) maintaining a next frame mask by updating said present mask to reflect any added or dropped output branches from said multicast connection; and (n) providing said next frame mask as a present mask for the cells of a subsequent frame and performing said steps (j)–(m).

7. The method of claim 1, wherein said plurality of multicast cells include a sequence of cells forming a frame, the sequence of cells including a last cell indicating an end of said frame, said method comprising the further steps of:

determining whether said last cell will not be received;

adding the received cells of said frame to a garbage queue if said last cell will not be received; and deleting the cells in said garbage queue from said memory.

8. The method of claim 7, wherein said step of adding the received cells to said garbage queue comprises the further steps of:
   maintaining said garbage queue using a linked list to identify the cells in said garbage queue;
   linking the received cells of said frame towards the end of said garbage queue; and
   setting said shared tail pointer to point to the last cell of a previously received frame, whereby memory is required to store a pointer to said last cell of a previously received frame.

9. The method of claim 7, wherein said step of adding the received cells to said garbage queue comprises the further steps of:
   maintaining said garbage queue using a linked list to identify the cells in said garbage queue;
   setting said shared tail pointer to point to the first cell of said frame; and
   adding only the second cell of said frame onwards to said garbage queue such that an extra cell remains in said multicast connection.

10. The method of claim 1, wherein said switch comprises a plurality of port cards with each port card being designed to have more than one port, the method further comprising the step of maintaining a central storage space for storing said plurality of cells received on said multicast connection.

11. The method of claim 10, further comprising the step of storing a copy of said linked list in each of said plurality of port cards.

12. The method of claim 1, wherein a unicast connection comprises a single output branch, and wherein steps (a), (b) and (f) are performed to transmit cells of said unicast connection on said single output branch.

13. The method of claim 1, wherein said indication comprises an aggregate number of branches dropped between the storing of a previous cell and said associated cell, wherein said aggregate number represents the number of branches dropped less the number of branches added, said method comprising the further step of decrementing said aggregate number associated with said multicast cell if the associated port mask indicates that said output branch presently being examined has been dropped.

14. The method of claim 13, wherein step (f) comprises determining whether the corresponding port mask indicates that the multicast cell need not be transmitted on any of the plurality of output branches and the associated aggregate number is equal to zero.

15. The method of claim 14, further comprising maintaining a aggregate number associated with each of said plurality of multicast cells.

16. A switch having support for multicast transmissions, said switch comprising:
   means for receiving a plurality of multicast cells in a cell order on a multicast connection, wherein each of said plurality of multicast cells needs to be transmitted on a plurality of output branches to achieve a multicast transmission with each of said plurality of output branches being associated with one of a plurality of ports in said Switch;
   means for storing said plurality of multicast cells and an associated linked list in a memory, wherein said linked list identifies said cell order;
   means for maintaining a plurality of logical queues with each logical queue corresponding to one of said plurality of output branches, wherein each of said plurality of logical queues is represented by a head pointer pointing to said linked list, and wherein each head pointer identifies a next multicast cell to be transmitted for a corresponding one of said plurality of output branches;
   means for scheduling for transmission said plurality of multicast cells on each of said plurality of logical queues by traversing said linked list using a corresponding head pointer, wherein each head pointer is updated to point to the next multicast cell to be transmitted in the corresponding logical queue, wherein said port mask for each multicast cell is updated to reflect the transmission of the corresponding multicast cell on the branches indicated by the port mask;
   means for determining whether to delete said cell from said memory based on both said port mask and said indication; and
   means for deleting said multicast cell if said means for determining determines to delete said multicast cell.

17. The switch of claim 16, further comprising means for providing a shared tail pointer for all of said queues such that only said shared tail pointer needs to be updated upon the arrival of a new multicast cell on said multicast connection.

18. The switch of claim 16, wherein said indication comprises an aggregate number of output branches dropped between the storing of a previous cell and said associated cell, said switch comprising means for decrementing said aggregate number associated with said multicast cell if the associated port mask indicates that said output branch presently being examined has been dropped.

19. The switch of claim 18, wherein said means for determination bases the determination on whether the corresponding port mask indicates that the multicast cell need not be transmitted on any of the plurality of output branches and the associated aggregate number is equal to zero.

20. The switch of claim 19, wherein said means for maintaining a aggregate number maintains a aggregate number associated with each of said plurality of multicast cells.

21. A switch having support for multicast transmissions, said Switch comprising:
   an ingress processor for receiving a plurality of multicast cells in a cell order on a multicast connection, wherein each of said plurality of multicast cells needs to be transmitted on a plurality of output branches to achieve a multicast transmission with each of said plurality of output branches being associated with one of a plurality of ports in said switch;
   a traffic manager coupled to said ingress processor for receiving said plurality of multicast cells and providing an identifier associated with said multicast connection when each of said plurality of multicast cells are received;
   a cell data path coupled to said ingress processor for storing said plurality of multicast cells in a memory, wherein said cell data path stores only one copy of said plurality of multicast cells in said memory;
   a memory manager coupled to said cell data path, said memory manager providing an address in said memory for each of said plurality of multicast cells, wherein said cell data path uses said address to store a corresponding one of said plurality of multicast cells; and
   a queue manager coupled to said traffic manager, said queue manager receiving said address provided by said memory manager and maintaining a linked list identifying a cell order in which said plurality of multicast cells are received, said queue manager providing a head pointer for each of said output branches; and a scheduler traversing said linked list using each of said head pointers to schedule said plurality of multicast packets for transmission on a corresponding one of said plurality of branches, said queue manager maintaining a port mask associated with each of said plurality of multicast cells stored in said memory, wherein said port mask identifies a set of ports on which a corresponding multicast cell is yet to be transmitted, said port mask being set to indicate when a branch corresponding to a port has been dropped from the multicast connection, said queue manager also maintaining an indication associated with a multicast cell stored in said memory, wherein said indication indicates whether a branch of said multicast connection has been dropped prior to the reception of said associated multicast cell, said queue manager determining whether to delete said multicast cell based on both said indication and associated port mask.

22. The switch of claim 21, wherein said queue manager includes memory to store a shared tail pointer for all of said output branches such that only said shared tail pointer needs to be updated upon the arrival of a new multicast cell on said multicast connection.

23. The switch of claim 21, wherein said indication comprises an aggregate number of output branches dropped between the storing of a previous cell and said associated cell, wherein said aggregate number represents the number of branches dropped less the number of branches added, and wherein said queue manager decrements said aggregate number associated with said multicast cell if the associated port mask indicates that said output branch presently being examined has been dropped.

24. The switch of claim 23, wherein said means for determination bases the determination on whether the corresponding port mask indicates that the multicast cell need not be transmitted on any of the plurality of output branches and the associated aggregate number is equal to zero.

25. The switch of claim 24, wherein said means for maintaining a aggregate number maintains a aggregate number associated with each of said plurality of multicast cells.

26. A method of adding or deleting a branch to a multicast connection transmitting a sequence of frames in the form of cells, said method comprising:

receiving a plurality of cells containing payload forming a first frame on said multicast connection, wherein said multicast connection is setup with a plurality of branches;

storing said plurality of cells in a memory;

generating a mask for associating with each cell, wherein the mask associated with each cell indicates the branches on which the cell is to be transmitted;

receiving a request to add or delete said branch to said multicast connection;

associating said mask with all of said plurality of cells even if said request is received in the middle of receiving said first frame; and associating a new mask reflecting the addition or deletion of said branch with cells related to a new frame.

27. The method of claim 26, further comprising:

generating said new mask immediately upon receiving said request; and storing said new mask in a memory location until a cell indicating the beginning of said new frame is received.

28. A method of deleting and then adding a branch to a multicast connection in a switch, said multicast connection having a plurality of branches including said branch, each branch being associated with a port contained in said switch, said method comprising:

receiving a first request to drop said branch and then a second request to add said branch;

storing a plurality of cells in a memory, said plurality of cells being received on said multicast connection after receiving said first request but before receiving said second request; and transmitting said plurality of cells on all of said plurality of branches except said branch requested to be dropped by said first request; and adding said branch to said multicast connection only after completion of said transmitting.

29. The method of claim 28, further comprising maintaining a status bit associated with each branch, wherein said status bit indicates whether any cells are pending transmission on the associated branch, said adding being performed only when said status bit indicates that no cells are pending transmission on the associated branch.

30. A method of processing a first plurality of cells and a second plurality of cells received by a switch on a connection in a cell order, wherein the payload data in said first plurality of cells forms a complete frame and the payload data in said second plurality of cells forms a partial frame, said second plurality of cells being received after said first plurality of cells, said method comprising:

storing said first plurality of cells and said second plurality of cells in a memory in the form of a first linked list;

maintaining a garbage queue for flushing incomplete frames, wherein said garbage queue is maintained in the form of a second linked list;

determining that said second plurality of cells forms an incomplete frame which needs to be flushed from said memory;

removing said second plurality of cells, except said first cell, from said first linked list and adding to said second linked list.

31. The method of claim 30, further comprising causing said first cell of said second plurality of cells to be unused.

32. The method of claim 31, wherein said causing comprises setting the memory location storing said first cell to a value equal to end of frame marker.

33. The method of claim 31, wherein said first linked list is defined by a first head pointer and a first tail pointer, said first head pointer indicating a next cell to be transmitted on said connection and said first tail pointer indicating a location in said memory where a last cell received in said memory is stored, said second linked list being defined by a second head pointer and a second tail pointer pointing to the first and last locations of said garbage queue.

34. The method of claim 33, further comprising maintaining a present head pointer pointing to the first cell of said partial frame, wherein said cell order specifies said first cell of said partial frame, said method further comprising:

setting said second tail pointer to equal said first tail pointer; and then setting said first tail pointer to equal said present head pointer.

35. The method of claim 30, wherein said determining comprises detecting the expiration of a timer since the reception of the last cell in said second plurality of cell specified by said cell order.

36. A switch for adding or deleting a branch to a multicast connection transmitting a sequence of frames in the form of cells, said switch comprising:

means for receiving a plurality of cells containing payload forming a first frame on said multicast connection, wherein said multicast connection is setup with a plurality of branches;

means for storing said plurality of cells in a memory;

means for generating a mask for associating with each cell, wherein the mask associated with each cell indicates the branches on which the cell is to be transmitted;

means for receiving a request to add or delete said branch to said multicast connection;

means for associating said mask with all of said plurality of cells even if said request is received in the middle of receiving said first frame; and means for associating a new mask reflecting the addition or deletion of said branch with cells related to a new frame.

37. The switch of claim 36, further comprising:

means for generating said new mask immediately upon receiving said request; and means for storing said new mask in a memory location until a cell indicating the beginning of said new frame is received.

38. A switch for deleting and then adding a branch to a multicast connection in a switch, said multicast connection having a plurality of branches including said branch, each branch being associated with a port contained in said switch, said switch comprising:

means for receiving a first request to drop said branch and then a second request to add said branch;

means for storing a plurality of cells in a memory, said plurality of cells being received on said multicast connection after receiving said first request but before receiving said second request; and means for transmitting said plurality of cells on all of said plurality of branches except said branch requested to be dropped by said first request; and means for adding said branch to said multicast connection only after completion of said transmitting by said means for transmitting.

39. The switch of claim 38, further comprising means for maintaining a status bit associated with each branch, wherein said status bit indicates whether any cells are pending transmission on the associated branch, said means for adding performing said adding only when said status bit indicates that no cells are pending transmission on the associated branch.

40. A switch for processing a first plurality of cells and a second plurality of cells received by a switch on a connection in a cell order, wherein the payload data in said first plurality of cells forms a complete frame and the payload data in said second plurality of cells forms a partial frame, said second plurality of cells being received after said first plurality of cells, said switch comprising:

means for storing said first plurality of cells and said second plurality of cells in a memory in the form of a first linked list;

means for maintaining a garbage queue for flushing incomplete frames, wherein said garbage queue is maintained in the form of a second linked list;

means for determining that said second plurality of cells forms an incomplete frame which needs to be flushed from said memory;

means for removing said second plurality of cells, except said first cell, from said first linked list and adding to said second linked list.

41. The switch of claim 40, further comprising means for causing said first cell of said second plurality of cells to be unused.

42. The switch of claim 41, wherein said means for causing comprises means for setting the memory location storing said first cell to a value equal to end of frame marker.

43. The switch of claim 41, wherein said first linked list is defined by a first head pointer and a first tail pointer, said first head pointer indicating a next cell to be transmitted on said connection and said first tail pointer indicating a location in said memory where a last cell received in said memory is stored, said second linked list being defined by a second head pointer and a second tail pointer pointing to the first and last locations of said garbage queue.

44. The switch of claim 43, further comprising means for maintaining a present head pointer pointing to the first cell of said partial frame, wherein said cell order specifies said first cell of said partial frame, said switch further comprising:

means for setting said second tail pointer to equal said first tail pointer, and then setting said first tail pointer to equal said present head pointer.

45. The switch of claim 40, wherein said means for determining comprises means for detecting the expiration of a timer since the reception of the last cell in said second plurality of cell specified by said cell order.

\* \* \* \* \*